Feb. 24, 1953 J. P. ECKERT, JR., ET AL 2,629,827

MEMORY SYSTEM

Filed Oct. 31, 1947 9 Sheets-Sheet 1

INVENTORS
JOHN W. MAUCHLY &
JOHN PRESPER ECKERT, JR.
BY Busser & Harding
ATTORNEYS Feb. 24, 1953 J. P. ECKERT, JR., ET AL 2,629,827

MEMORY SYSTEM

Filed Oct. 31, 1947 9 Sheets-Sheet 2

INVENTORS
JOHN W. MAUCHLY &
JOHN PRESPER ECKERT, JR.
BY Busser & Harding
ATTORNEYS INVENTORS
JOHN W. MAUCHLY &
JOHN PRESPER ECKERT, JR.
BY Busser & Harding
ATTORNEYS Feb. 24, 1953 J. P. ECKERT, JR., ET AL 2,629,827

MEMORY SYSTEM

Filed Oct. 31, 1947 9 Sheets-Sheet 4

INVENTORS
JOHN W. MAUCHLY &
JOHN PRESPER ECKERT, JR.
BY Busser & Harding
ATTORNEYS

MEMORY SYSTEM

Filed Oct. 31, 1947 9 Sheets-Sheet 5

INVENTORS
JOHN W. MAUCHLY &
JOHN PRESPER ECKERT, JR.
BY
Busser & Harding
ATTORNEYS INVENTORS
JOHN W. MAUCHLY &
JOHN PRESPER ECKERT, JR.
BY
Busser & Harding
ATTORNEYS INVENTORS
JOHN W. MAUCHLY &
JOHN PRESPER ECKERT. JR.
BY Busser & Harding
ATTORNEYS

MEMORY SYSTEM

Filed Oct. 31, 1947 9 Sheets-Sheet 8

INVENTORS
JOHN W. MAUCHLY &
JOHN PRESPER ECKERT. JR.
BY
Busser & Harding
ATTORNEYS INVENTORS
JOHN W. MAUCHLY &
JOHN PRESPER ECKERT, JR.
BY
Busser & Harding
ATTORNEYS Patented Feb. 24, 1953 2,629,827

UNITED STATES PATENT OFFICE 2,629,827

MEMORY SYSTEM

John Presper Eckert, Jr., and John W. Mauchly, Philadelphia, Pa., assignors, by mesne assignments, to Eckert-Mauchly Computer Corporation, Philadelphia, Pa., a corporation of Pennsylvania Application October 31, 1947, Serial No. 783,328

36 Claims. (Cl. 250—27)

This invention relates to a memory system, and various elements thereof, the memory system being of a type into which information may be introduced electrically and from which information may be secured electrically, the system being particularly designed for association with other devices into machines for the carrying out of computational or other logical procedures.

Memory systems of the type just indicated are required in a large variety of devices for carrying out logical procedures wherein they have the function of receiving information, holding it, and transmitting it when and if required. A wide variety of devices have been used for this purpose. Mechanical memories as used in computing machines quite generally comprise series of wheels, the angular positions of which determine the information which is stored. Electrical relays have also been used for this purpose, information being coded to correspond to open or shut conditions of various contacts. Vacuum and gas tubes have also been used for this purpose, the information here also being coded in terms of conductive and non-conductive conditions of the tubes or in terms of ranges of potentials or the like.

The various memory systems just described have deficiencies which become particularly evident when the storing of a large quantity of information is involved. All of these systems are mechanically complicated by reason of the multiplicity of their elements required when any large amount of information is to be stored. All of them also involve the consumption of large amounts of power in their operation. Except for those systems involving vacuum tubes, they are also quite slow in operation when their speed is compared with that attainable by the use of vacuum tubes operating through the medium of electrical pulses.

One object of the present invention is the provision of a memory system operating on a principle quite different from any of the above. In accordance with the present system information is stored in a coded sequence of pulses, using that term in a quite broad sense, which pulses are caused to circulate through a path being introduced electrically into the input terminal of the path, travelling along the path for a particular delay or transit time and then being taken from the path electrically and again transmitted to the input end of the path for repetition of the cycle. What has been just referred to may be made clear by reference to several embodiments of the invention which will be described in detail hereafter. In one preferred embodiment, for example, the electrical input pulses are caused to produce in a liquid or solid medium acoustic pulses which are propagated through the medium to a terminal thereof, the transit time being such that at any instant in the medium there will exist a train of pulses which, by their nature and sequence, are representative of stored information. At the end of the transmission path the acoustic pulses are retranslated into electrical pulses which, through a feed-back system, give rise to a new set of acoustic pulses at the input. The net result is to produce through the acoustic pulse transmitting medium a continuous recirculation of a pattern of acoustic pulses characteristic of the stored information.

Alternatively, an electrical delay line may be substituted for the acoustic pulse transmitting medium with the result that a pattern of electrical pulses will recirculate through the delay line, similarly characteristic of stored information.

Equivalent to these are also mechanical systems which may take various forms exemplified by an endless disc or band on which pulses may be temporarily recorded and caused to recirculate. A rotating glass disc, for example, may have imprinted on the periphery thereof at an input station pulses in the form of electrostatic charges which will then be carried by rotation of the disc to another station where they give rise to electrical potential pulses which may be handled through an external feed-back circuit for replacement or reinforcement of the pulses on the disc. Analogous to this is the imprinting of pulses in the form of magnetized spots on a disc or endless band of magnetic material, in which case, however, a permanent pattern is imprinted subject to erasure or change. Still another example is the temporary imposition of pulses on phosphorescent material carried by a disc or other rotatable or circulatory member, imprinting being accomplished by a modulated light source and read-off being accomplished by means of a photocell.

In common in each of the above a predetermined sequence of pulses is caused to circulate in an orbital fashion.

The regeneration at the input of a circulatory pulse system of the signals emitted at its output has been referred to but in general, of course, mere continued recirculation would be of no particular value. Accordingly, in accordance with the invention an electrical feed-back system is provided which may effect modification of the circulating pulses having the functions of permitting continuous recirculation of all or any part of the circulating pulse pattern, erasure of all or any part of this, or pattern substitution or or introduction into any part of the pulse pattern of some other chosen pulse sequence. As a result information may be stored, taken out for use while still recirculating, taken out and erased, or replaced or modified by other information. The attainment of these objectives of the invention will become clearer hereafter with reference to specific examples of operations. It will, however, now become clear that the possibility of attaining these objectives in a memory system enables it to be associated with other devices into logical systems in which the holding of information for short or long periods is required. The special advantages of the type of system indicated are particularly apparent when the frequency of the pulses is in a range upward of one megacycle under which circumstances it will be evident that a very large amount of information may be stored in a circulatory system with compactness of the apparatus employed.

A circulatory system of the type described will ordinarily involve the possibility of cumulative errors due to inherent dimensional inaccuracies, temperature changes, deviations from precise frequency control and the like. Further objects of the invention accordingly relate to the provision of means for insuring proper operation despite these disturbing matters. In particular, the invention contemplates the provision of an automatic frequency control which will insure continuous operation with automatic compensation for temperature or other disturbances. In accordance with the invention reforming of pulses and retiming of pulses occurs to prevent cumulative changes of both pulse form and timing. The timing system also provides an index for the stored information so that in a particular pulse pattern there may be definitely identified and controlled the information in any particular part thereof.

Various other objects of the invention relate to the provision of improved elements such as acoustic tanks and electrical circuit elements and all of these objects will become apparent from the following description read in conjunction with the accompanying drawings in which.

Figure 1:
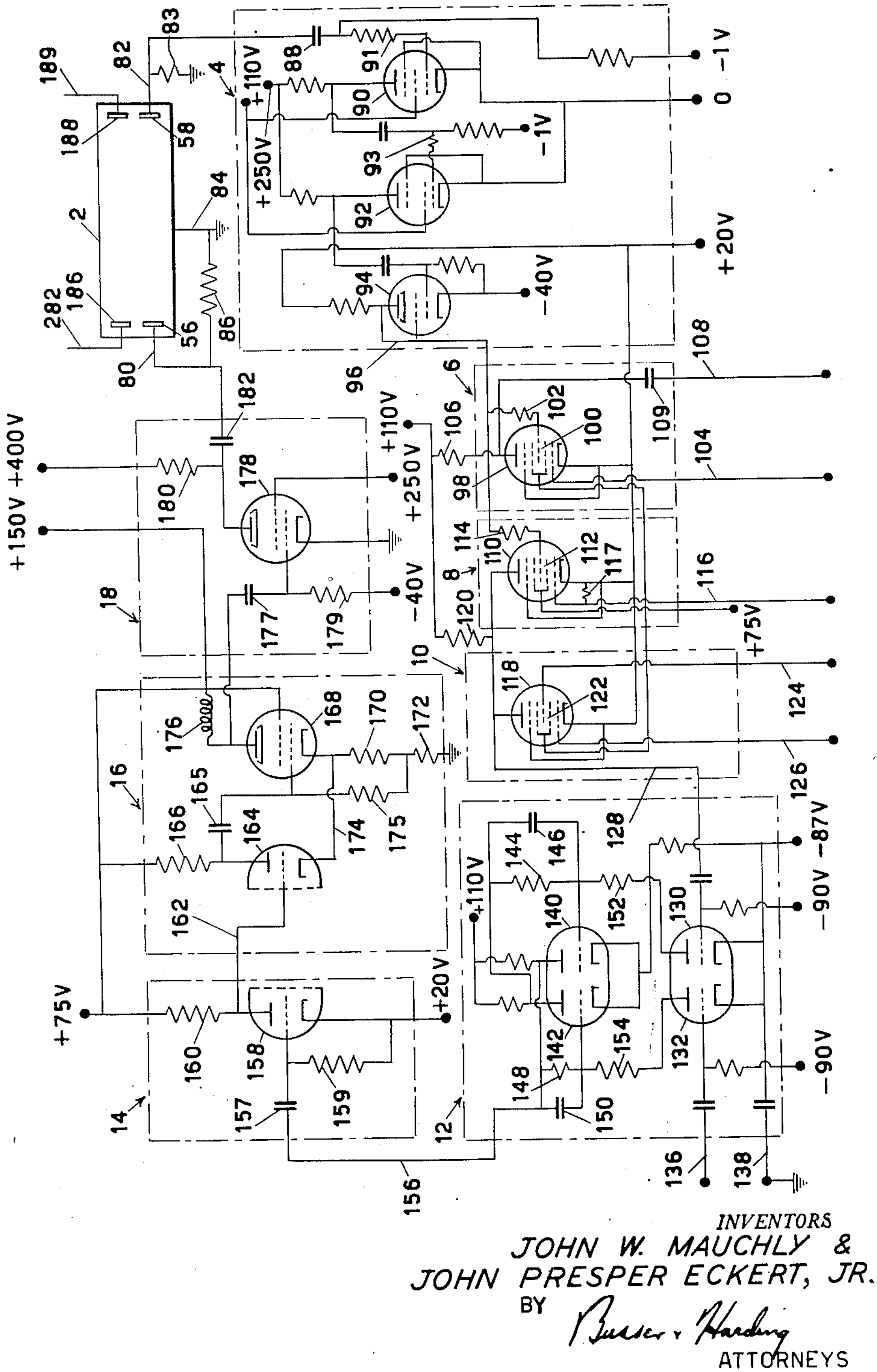
Figure 1 is a diagram illustrating in particular the devices for maintaining recirculation of acoustic pulses together with means for erasing pulses, feeding pulses into the recirculating system and taking off signals for external use; the circuit also illustrates pulse forming elements and pulse retiming elements.

The portion of the apparatus illustrated in Figure 1 comprises a number of separate elements which may be considered individual units from the standpoint of their functions. These comprise the memory tank 2, the tank output amplifier 4, the output gate 6, the clearing gate 8, the input gate 10, the pulse synchronizing flip-flop 12, the amplifier 14 and the amplitude limiter 16 (which elements 14 and 16 together constitute a pulse former or shaper), and the input driving amplifier 18.

Figure 14:
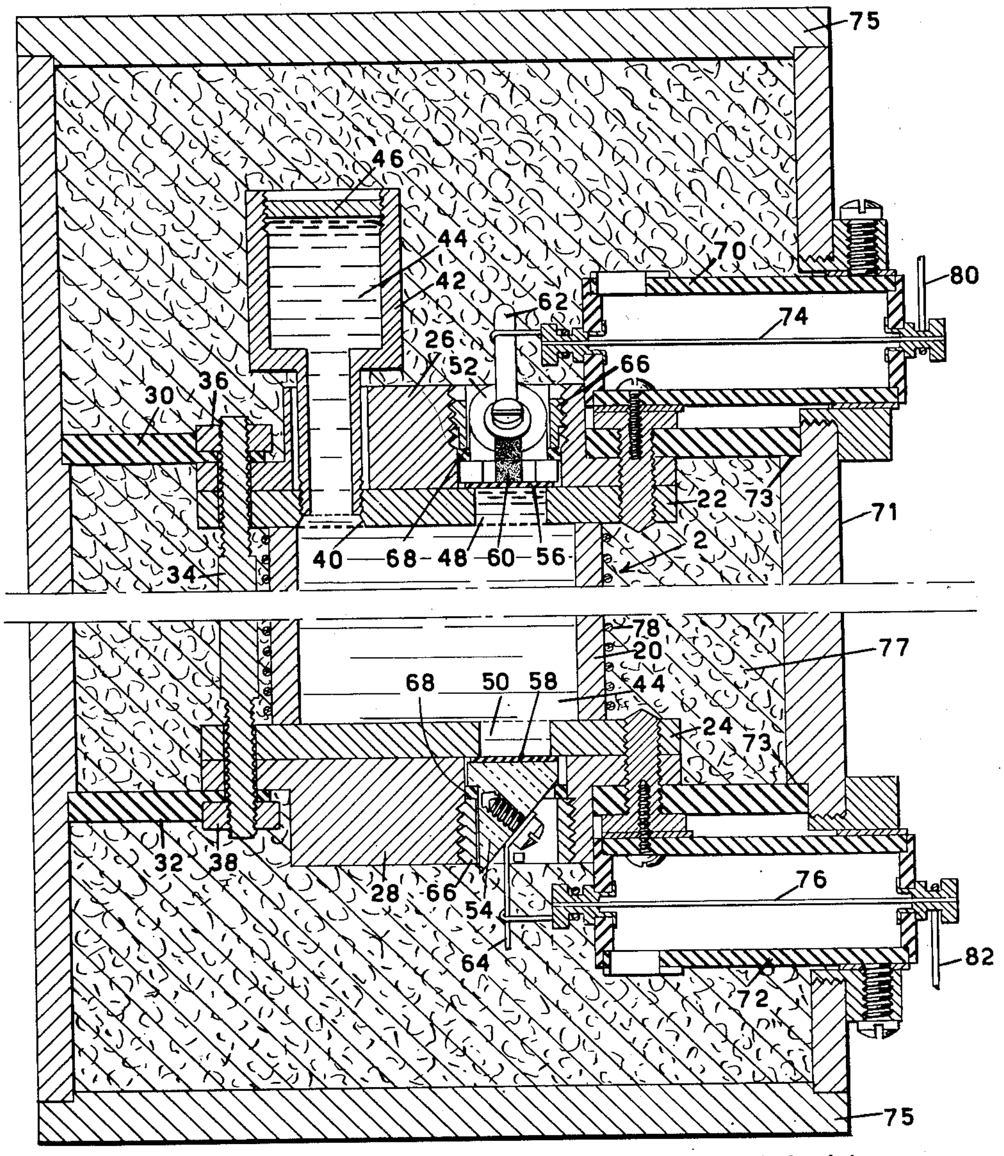
Figure 14 is an axial section through a preferred form of mercury tank involved in the recirculation of acoustic pulses.
Figure 15:
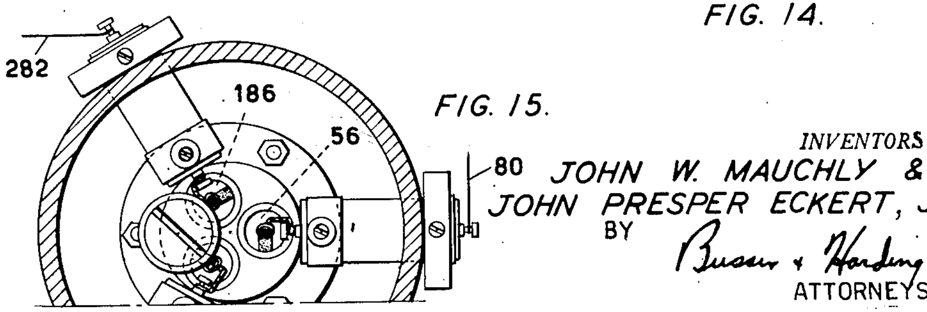
Figure 15 is a transverse radial section through the outer casing of the tank showing the upper ends of various elements of the tank.

The acoustic delay memory tank indicated generally at 2 is illustrated in detail in Figures 14 and 15. The tank as illustrated is constructed to contain three pairs of crystals of which in the apparatus hereafter described only two pairs are used. The purpose of the third pair or other additional pairs will, however, become clear hereafter.

A tubular stainless steel cylinder 20 of suitable length is closed at its ends by steel discs 22 and 24. Located outside these discs are end members 26 and 28. Associated with these end members are insulating discs 30 and 32 (having heat insulating rather than electrical insulating functions). The various parts just described are held together by bolts 34 on which are threaded nuts 36 and 38 arranged to clamp the elements together as illustrated in Figure 14 to provide mercury-tight closures at the ends of the tube 20. An opening 40 in the disc 22 has threaded therein an expansion tank 42 into which mercury 44 filling the tank 2 extends to provide a minimum gas pocket beneath a closure 46 for the expansion tank. Desirably air is excluded, either by reducing to a minimum any air pocket or by displacing it by an inert gas which will not oxidize the mercury. This may also be accomplished by providing an expandible bellows which will permit expansion of the mercury while excluding air. Openings 48 and 50 are arranged in pairs in the discs 22 and 24, and in line with these openings are quartz crystal assemblies consisting of ceramic carriers 52 and 54 mounting the crystals indicated at 56 and 58. In order to provide electrical conductivity to the outer faces of these crystals the ceramic carriers 52 and 54 are coated on the surfaces which carry the crystals with metallic silver which is continued upwardly in the form of strips as indicated at 60 under the metallic connectors 62 and 64 which are held on the ceramic carriers by screws. The quartz crystals 56 and 58 are soldered to the silver-coated inner surfaces of the carriers. As will be evident from Figure 14 the outer ends of the ceramic carriers terminate in flat bevel surfaces which have the function of preventing coherent acoustic waves from being reflected from the end surfaces back to the crystals.

The carriers are clamped in the assembly with the crystals against the portions of the discs 22 and 24 surrounding the openings 48 and 50 by means of threaded sleeves 66 bearing on intermediate annular insulating gaskets 68.

Special leads are provided to the crystal connectors 62 and 64 through the provision of tubes 70 and 72 of insulating material secured by screws to the tank assembly and serving to mount fine wires 74 and 76 which at their inner ends are connected to the connectors 62 and 64. External connections 80 and 82 to the wires 74 and 76, respectively, will be hereafter referred to.

In order to provide heat insulation for the mercury tank assembly the discs 30 and 32 are supported against shoulders 73 in the interior of an outer tube 71 which is closed by end caps 75. Suitable heat insulating material indicated at 77 fills the annular space between the mercury tank and the cylinder 71 and also the ends of the latter within the caps 75.

A heating coil 78 surrounds the mercury tank as indicated having its ends (not shown) extending outwardly through an opening in the tank 71.

While as will be evident hereafter compensation for temperature changes is provided by suitable electrical means it is nevertheless desirable that the mercury tank should be held as nearly as convenient to a constant temperature. It is for this reason that it is enclosed within the cylinder 71 with the provision of the insulating material 77. It is also for this reason that the leads 74 and 76 to the crystals are provided in the form of thin wires in the coaxial systems provided by the tubes 70 and 72 and their associated elements. The exterior surfaces of the tubes 70 and 72 are coated with metal such as silver in very thin layers while the wires 74 and 76 are quite fine. The result is that heat conduction along the electrically conductive paths is minimized.

While only one pair of crystals 56 and 58 is illustrated the tank as shown and as will be clear from Figure 15 contains two additional pairs of crystals, one pair consisting of the crystals 186 and 188 which will be hereafter referred to. The third pair of crystals are not shown as utilized in the present disclosure. It has been found that when a tank such as that illustrated is filled with mercury and if pairs of crystals are arranged opposite each other as shown, acoustic waves generated in the mercury by one of them are transmitted substantially as a cylindrical beam to the opposite crystal with rather little spreading or dispersion. Accordingly, pairs of crystals may be thus arranged in contact with a single body of mercury without the occurrence of cross-talk, i. e., the crystals of each pair cooperate substantially to the exclusion of effects on the adjacent pairs of crystals. While the tank illustrated is arranged to stand upright, it is sometimes more desirable to have the tank arranged for horizontal transmission of signals.

Satisfactory crystals for the purposes of transmission of acoustic waves through mercury may be 0.015 inch in thickness and highly polished at least on those sides which are in contact with the mercury. This latter condition is quite important since a roughly cut or unpolished crystal may result in entrapment of air at the mercury-crystal interface and then will not be nearly as effective for the piezo function of the crystal in this device. Quartz crystals for this purpose should be X-cut so that they will produce longitudinal acoustic, ultrasonic waves in the mercury when subjected to electrostatic potentials between their surfaces in the form of pulses. Piezo crystals other than quartz may be used, properly cut in fashions well known to the art for the best efficiency in producing longitudinal waves when a liquid transmission medium is used. However, when a solid medium is used, shear waves constitute the most efficient mode for transmission, these travelling slower than longitudinal waves. Crystals should then be suitably cut to produce shear waves to the substantial exclusion of longitudinal and transverse waves: for example a BT-cut quartz crystal will produce almost pure shear waves in a solid medium such as glass.

While mercury is the desirable liquid used for reasons hereafter discussed, other liquids may be used for the transmission of the acoustic waves and in such cases the application of metal directly on the surface of the crystals by a plating process is desirable to provide proper conductivity to the crystal faces which may be in contact with an insulating liquid. However, owing to amalgamation of the ordinary plating metals with mercury, and since mercury is itself a conductor, it is desirable in the case of a mercury tank merely to provide a high polish on the crystal surfaces in contact with the mercury. The result is essentially the same as that secured by additional plating.

While in cases where the standardizing of the form of the pulse delivered from the memory device is effected on each orbital transmission of a pulse or its equivalent, the strict preservation of an ideal wave curve form in the mercury element may not be essential for the functioning of the resultant pulse taken out of the register, for other reasons or at other times it is desirable to effect such preservation of pulse rise, top, and drop characteristics of the standard pulse in the wave propagated in the mercury tank. For this purpose a departure from conventional practice in the use of piezo-electric devices is made in this instance. As is known, under the influence of opposite potentials applied to plates at opposite sides of a piezo crystal oriented on a proper axis, the entire crystal becomes thickened or thinned, depending upon the polarity of the applied potential. This in our invention produces a movement of one face of the crystal against the mercury and the beginning of the propagation of a wave or pulse. Since the crystal has a finite thickness, the application of a potential in the form of a step function, in giving rise to a change of thickness at every point of the crystal, causes the production of an approximately linear rise of pressure in the mercury or other transmitting medium. The fall in pressure following such rise is determined by both the characteristics of the crystal and of the tank. Some reflections from the crystal faces also appear. When, as here, pulses are to be transmitted at intervals of the order of one microsecond, more or less, these phenomena become material. They become manifest in lengthening of the pulse itself with interference or partial neutralizing of one pulse by another in transmission, by overlap and modification of rise time or of effective amplitude. When extremely closely spaced pulses are transmitted, it is necessary that they be of short length in relation to the time or space interval between discrete pulses in order that the potential of one may reach its zero value before another begins, and also in some cases so that intervening time may be available in which other devices may function in response to interspersed pulses of alternated timing. It is conceivable that a crystal might be of such thickness that response to a pulse having a duration of one quarter the period of pulse interval would produce a pulse of a length occupying all or more than the desired pulse interval. Consequently, in our invention, it is necessary that the thickness of the crystal be as nearly as practicable proportionate to a desired minimum duration of the pulse, when this is short, or to the interval between pulses, when this interval is short.

We have found that a quartz crystal response highly effective as compared to that of thicker crystals, may be obtained by reducing the thickness of the crystal to 0.015 inch with a good workable minimum of those effects which prevent sharp rises and falls of the transmitted pulses. In general the transit time for a wave across the crystal should be short relative to the wave period.

If connections are made across the face of the transmitting crystal 56 and an electrical source in a circuit giving rise to pulses, then on each pulse of the circuit, the crystal being non-conductive, a capacitance effect will be produced across the crystal accompanied by the expansion and contraction of the crystal as the potential rises or falls in the circuit, the crystals being properly cut and oriented in relation to the polarities applied. The abrupt response of the crystals to such pulses will propagate corresponding acoustic waves in the mercury in contact with one side of the crystal. By means which will be explained hereafter, the crystal-actuating electrical pulses which we produce involve rise and fall characteristics such that a very abrupt rise and a very abrupt fall of potential or vice versa are produced within a very short time interval, say, one and one-half microseconds or less. There is ordinarily a tendency in the crystal due to its natural resonant period to produce echo or secondary wave forms, but such function is undesired here, and due to the very closely similar acoustical impedance value of the crystal and the mercury or other medium in contact with the crystal, this tendency of the crystal is suppressed so that, except for minor and unimportant oscillations, acoustic waves limited essentially to a single planiform advancing front of compression, with a single planiform following rarefaction are produced. Such a wave when graphically represented would have a nearly vertical front or rise, proportional to voltage applied, a flat top and a very sharp drop or fall at the back with no detrimental advance or following ripples, and an abscissa time value closely conforming to the duration of that electrical pulse across the crystal from which the acoustic wave originates.

At the same time as a pulse is produced in the mercury there will also be produced a pulse or wave leaving the crystal in the opposite direction and passing through the ceramic mounting. If this ceramic is chosen to have also substantially the acoustic impedance value of the crystal unwanted reflections are reduced to an insignificant value. The inertia of the backing of the crystal causes a wave propagated in the ceramic backing to equal in kinetic energy value that propagated in the mercury. This wave propagated in the ceramic, though reflected from the bevelled end of the support and thereafter multiply reflected within the support, will not enter the mercury, the angle of reflection preventing this. After a number of such reflections, the energy of this wave is dissipated. Thus there are eliminated any reflecting, resonating, or other interfering distinguishable acoustic pulses that would impair the distinctness of any succeeding wave propagated from the crystal through the mercury by reason of an electrical impulse acting across the crystal and very closely following the first transmitted pulse.

The wave transmitted longitudinally through the mercury acts upon the receiver crystal 58 with piezo effect, producing corresponding electrical response in the crystal. Between the faces, accordingly, there is manifested a difference of electrical potential which may be utilized for various purposes as hereafter indicated. The bevelled outer end of the ceramic support for the receiving crystal 58 reflects pulses which its receives and transmits them to the side of the ceramic support where such reflections are dissipated without being fed back into the mercury.

Aside from providing good acoustic impedance match to minimize reflections, the ceramic support has the function of mechanically supporting the fragile crystal to prevent accidental breakage.

Returning now to Figure 1, the details of the various electrical elements therein may be considered.

A leak resistance 86 bridges the input lead 80 to ground to prevent build-up of high direct potential across the crystal 56. A similar leak resistance 83 connects output lead 82 to ground.

The utilization of the piezo effect at the receiver crystal 58 is effected by connecting the delayed output lead 82 through condenser 88 and resistance 91 to the control grid of a tube 90 which constitutes the first stage of the triple stage amplifier designated generally at 4, comprising in addition to the tube 90 the second and third stage tubes 92 and 94. This amplifier is conventional in character and of the type commonly used for video amplification purposes, i. e. of wide band characteristics. It may be here noted that throughout the description of the circuits herein no particular reference need be made to conventional connections, some of which are merely indicated in the drawings, while others, such as heater connections are omitted. Typical voltages are indicated only where they serve to aid in understanding the tube functions. It will, of course, be understood that instead of the types of tubes illustrated, other types of tubes may be used in accordance with conventional practices. The elements of these tubes have conventional connections to direct power supplies, and the heaters which are not illustrated may be supplied as usual from low voltage transformers.

The only part of the amplifier 4 deserving special mention is the resistor 91 in series with the control grid of tube 90, which resistor limits the grid current in the event that the grid is driven positive by the trailing positive portion of a normally negative pulse delivered through the condenser 88. The same reason dictates the provision of the resistor 93 in series with the grid of the second stage tube 92.

The negative pulses applied to the grid of the tube 94 will in the case of normal operation be of sufficient amplitude to drive the tube 94 beyond cut-off. It will be noted that the plate potential of this tube is quite low, and consequently the positive swing of its grid will drive it into saturation. Accordingly, the tube has a clipping function, squaring the output pulses so that, as delivered through the connection 96, they are substantially rectangular positive pulses corresponding to the negative pulses in the line 82. The low anode potential on the tube 94 insures that any positive pulses in the line 82 will have no substantial effect contrary to the production of positive output pulses from the amplifier corresponding only to negative input pulses.

The output from the line 96 is fed through a resistor 102 to the second control grid 100 of a pentagrid dual control tube 98. It will be noted that the anode of this tube is connected to a positive 110 volt supply through a load resistor 106, while the cathode is connected to +20 volts. The grid 100, being connected to the anode of the tube 94, is at a positive potential of only a few volts in the absence of a pulse in view of the substantial saturation of the tube 94. The grid 100, therefore, is at a negative potential relative to its cathode so that this tube in the absence of pulses is cut off. As will be hereafter made clear, the potential applied to the first control grid of the tube 98 through the connection 104 is also normally substantially more negative than the cathode so that this grid also imposes a cut off condition. The tube 98 therefore becomes conductive only when a positive pulse through the line 96 coincides with a positive potential applied to the connection 104. Signals are delivered from the tube 98 through the condenser 109 and line 108 in the form of negative pulses when coincidence of positive conditions of the two control grids exists. It may be here noted in passing that these elements indicated generally at 6 provide the pulse output from the system.

The next element 8 of the system constitutes a circulation gate which has the property of normally passing pulses with the possibility of blocking them. The tube 110 is similar to the tube 98, and its second control grid 112 receives through the resistor 114 the same signals from the line 96 as the second control grid of the tube 98. However, in this case the first control grid through the connection 116 is normally maintained at cathode potential or positive with respect to its cathode so that positive pulses in the connection 96 produce current flow in the tube 110, with the result that corresponding negative pulses are produced in the line 128 due to current flow through the load resistor 120. A resistor 117 connects the first control grid of tube 110 with its cathode.

When the first control grid of the tube 110 is driven negative through its external connection 116, it will be in a cut-off condition irrespective of positive pulses on its second control grid. Accordingly the effect is to interrupt the transmission of pulses, clearing from the recirculating system the pulses therein.

The elements indicated at 10 constitute an input pulse gate. The tube 118 has its second control grid 122 connected to the external line 124 while its first control grid is connected to the external line 126. Its anode shares with the anode of the tube 110 the load resistor 120. This arrangement provides for the input of pulses into the system. As will be hereafter indicated, positive input pulses through the line 126 to the first control grid, if coincident with a positive potential applied to the second control grid through the line 124, will produce negative pulses in the line 128 either supplementing, if coincident with, or interspersed with, if not coincident with, the pulses, if any, originating from the tube 110. Of course, if the tube 110 is in clearing (cut-off) condition, the sole pulses which will appear in the line 128 will be due to the pulses in the line 126 acting through the tube 118. If the circulation gate 8 is open and no input in provided in either the line 124 or the line 126, then the pulses in the line 128 will be only those circulating in the system. The tank may be completely cleared if no pulses are delivered by either of the elements 8 or 10 to the line 128.

The element 12 of the system has the function of re-timing the circulating pulses and of properly timing the input pulses. Unless such a timing means was provided, timing errors would be cumulative. The line 128 feeds its negative pulses to the grid of a tube 130, which is illustrated as one triode element of a dual triode. A second triode 132 is fed an uninterrupted stream of equally spaced controlled timing pulses, which will be more fully referred to hereafter, through the grid connection 136, the cathode connection 138 being grounded. The grids in both cases are fed positive pulses. The tubes 130 and 132 are merely amplifiers, supplying pulses to the flip-flop circuit consisting of a pair of tubes 140 and 142 connected in conventional fashion by cross connections of their anodes and grids through the respective resistance-capacitance arrangements 144, 146 and 148, 150. The grids of the triodes 140 and 142 are respectively connected to the anodes of the tubes 130 and 132 through the resistors 152 and 154.

In the proper operation of the system the positive pulses delivered through the line 128 are slightly in advance of the positive pulses delivered through the line 136. The resulting action is accordingly as follows:

The first arriving positive pulse on the grid of the tube 130 produces an increased flow of current in this tube and produces a negative pulse on the grid of the tube 140, causing cut-off of this tube which was previously conductive and rendering conductive the tube 142. The result is a positive pulse in the line 156 which, as will be presently indicated, is without effect. The timing pulse which arrives immediately thereafter as a positive pulse through the connection 136 produces an increase in current flow in the tube 132 which drives the grid of the tube 142 negative, cutting off this tube and restoring flow of current in the tube 140. The result is a negative pulse in the line 156. It will be evident that subsequent positive pulses in the line 136 will not effect any change in the flip-flop circuit until the flip-flop is thrown over by a positive pulse from the line 128. Accordingly the negative effective pulses in the line 156 will be produced only when a positive pulse in the line 128 precedes a positive timing pulse in the line 136. The result is that for each positive pulse in line 128 there is produced a properly timed negative pulse in the line 156.

The pulses delivered along line 156 to tube 158 have a sharp leading edge precisely located in time by the action of the flip-flop circuit of tubes 140 and 142, as determined by the operation previously described. The trailing edge of the pulse that is applied to the grid of tube 158, however, is defined only by the decay time of condenser 157 through the resistor 159. What is required at the input to the acoustic delay tank is a narrow rectangular pulse, and the tubes of the circuit element 16 constitute a pulse former to produce such a narrow rectangular pulse. The tube 158 has its grid connected through its resistor 159 to the same potential as its cathode, thus causing it to be normally saturated. Negative pulses arriving on line 156 then drive the grid of this tube beyond cut-off to produce flat-topped positive pulses at its plate, which are fed through a line 162 directly to the input grid of tube 164.

The plate of triode 158 is connected through a resistor 160 to a 75-volt potential source and is also connected directly to the grid of triode 164. Triode 164 and a tube 168 constitute a special kind of flip-flop for generating pulses of standard shape and amplitude. The cathodes of 164 and 168 are tied together and are connected to zero potential through resistors 170 and 172, which may have values of 100 and 1000 ohms respectively. Tube 168 is a pentode used in a special manner to achieve the desired results. The second, or screen, grid is here employed as a virtual plate at a moderately high positive potential. The tube may thus act as a triode in the flip-flop circuit, allowing the output pulse to be obtained from the plate of 168 without loading the flip-flop circuit. The direct current coupling between the tubes 164 and 168 is achieved by the cathode bridge 174, having the series resistors 170 and 172, to zero potential, while additional coupling of A. C. signals is provided through a condenser 165 from the plate of 164 to the first grid of 168. The proper bias for this grid is obtained by connecting it, through a high resistance 175 (of 100,000 ohms) to the junction between 170 and 172. This flip-flop is not symmetric, and normally on tube 168 conducts and triode 164 does not. This may be seen in the following way. In the absence of any changes in the condition of operation of 164, the control grid of 168 will come to the potential of the junction point between 170 and 172. Tube 168 is then self-biased, and will conduct. Resistance 172, chosen as ten times that of 170, causes the cathodes of 168 and 164 to rise well above 20 volts when 168 is conducting in this way. But normally 158 is conducting, and its internal impedance is small compared to the load resistance 160. Hence, the plate of 158 and the grid of 164 are just slightly above 20 volts. Since the cathode of 164 is well above 20 volts, 164 is rendered non-conducting. Now when a negative change through 157 causes 158 to cut off momentarily, the grid of 164 is thus momentarily at +75 volts, and 164 conducts. The plate of 164 is connected through a resistor 166 to the +75 volt supply, and the current which now flows through 166 when 164 conducts causes the plate potential of 164 to drop below +75 volts. This drop in potential is transmitted through condenser 165 to the first grid of 168, and the currents to both the screen grid and the plate of 168 are thereby reduced because of conduction in the triode. But these currents flow also through 170 and 172, and when they are reduced, the cathodes of 164 and 168 approach zero potential. The circuit is so designed that this reduction in current more than offsets the increase in current in 164, so that the overall result is to make the cathode of 164 even more negative with respect to its grid, increasing the plate current in 164 still further. This regenerative action succeeds in cutting off tube 168 within a time interval which is practically independent of the characteristics of the pulse which initiated the action.

The occurrence of a negative change in potential through 157 thus initiates a flip-flop action in tubes 164 and 168, with the result that the normally large plate current in 168 is temporarily reduced to zero in a standard manner almost independent of the character of the initiating voltage change, so long as that be negative and sufficient to cause operation at all.

The plate current for tube 168 comes from a 150 volt source through the 2.5 mh. choke 176. The plate of 168 is coupled to the grid of the pentode 178 by a condenser. The grid of 178 is also connected through a resistor 179 to a negative potential source of —40 volts, while the cathode of 178 is at zero. A positive screen potential of 250 volts is applied to the second grid of 178, and the plate is connected to a positive voltage supply through a resistor 180.

Normally, tube 178 is non-conducting, as it is biased beyond cut-off. But when the flip-flop 164, 168 is actuated, and the plate current of 168 drops to zero, the inductance 176 and capacity 177 pass a positive pulse to the grid of 178, and this pulse will be of standard shape and amplitude. The corresponding negative pulse in the plate circuit of 178 is then passed through condenser 182 to the input terminal 80 of the delay element 2, and is of a similar short duration and of a standard potential.

In summary of what is illustrated in Figure 1 it may be described as a device involving circulation of pulses continuously in much the same fashion as such pulses would be circulated if carried by a rotating disc, endless band or other circulatory elements, with provision for erasing the pulses for introducing new pulses or for taking off signals corresponding to the recirculating pulses. As will become apparent hereafter the pulses may be considered as circulating in groups which may be utilized or controlled as units, with utilization of the individual pulses in the various groups.

Before proceeding with the description of a complete system including input to and output from the pulse memory system of Figure 1, there will be described certain circuit elements which will be found later to be present in, generally with repetition, Figures 10 and 11 hereafter described.

Figure 2:
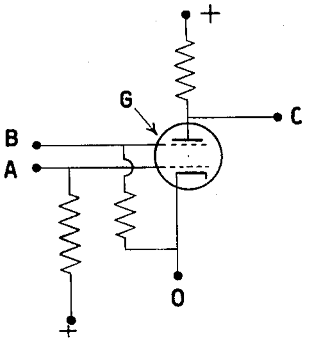
Figures 2 and 3 are diagrams illustrating two types of gates used in the system.

Figure 2 illustrates a gate of a type which will be hereafter referred to as G or a "normally on" gate. This gate comprises a thermionic vacuum tube containing at least two control grid elements, and possibly others, depending upon the choice of tube best suited for the particular portion of the circuit in which this gate is to be embodied. Irrespective of the specific nature of the tube, however, what is involved for present gating purposes is the use of the two control grids connected to terminals A and B. The grid connected to terminal B is connected to the cathode through a resistor. This grid is, accordingly, at a potential such that, if terminal A is positive, there will result anode current flow through the anode load resistor connected to a positive potential source. On the other hand, the anode current will normally be cut off by the application of a negative bias to the terminal A. Ordinarily, no negative signal being applied to terminal B, anode signals, provided at terminal C as negative pulses, will be produced by the application of positive pulses to terminal A. However, the emission of pulses at C may be inhibited by the application of a negative gating potential to terminal B. A gate of this type (in the form of a pentagrid tube) has already been indicated at 8 in Figure 1. It may be noted that a potential positive with respect to the cathode may normally be applied to terminal B.

Figure 3:
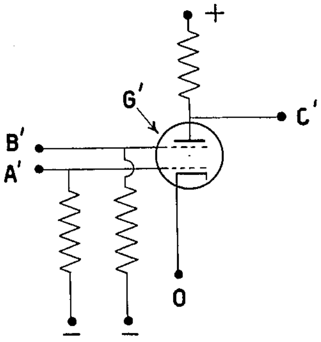

A second type of gate G' which will be referred to as a "normally off" gate is illustrated in Figure 3. This gate likewise comprises two control grids connected to terminals A' and B', there being such other tube elements as are suitable for the portions of the circuit in which the gate is involved. The output terminal C' is connected between the anode and its load resistor which is connected to a suitable positive potential. The two terminals A' and B' are normally connected through resistors to sources of negative bias such that either independently will effect ordinarily cut-off of anode current. A positive signal applied to only one of the terminals A' and B' will result in no output at C'; however, if positive signals or pulses are applied coincidentally at A' and B', then a negative pulse will be provided at C' having a duration equal to the duration of coincidence. Gates of the type G' have already been indicated at 6 and 10 in Figure 1 wherein they appear as pentagrid tubes.

Figure 4:
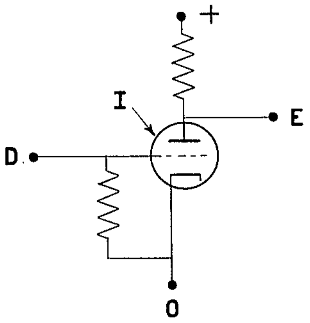
Figures 4 and 5 are diagrams illustrating two types of inverters used in the system.
Figure 5:
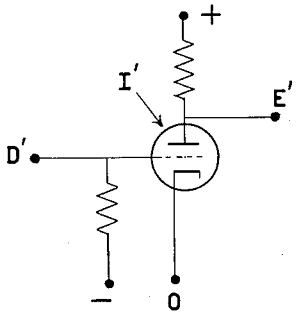
Figure 7:
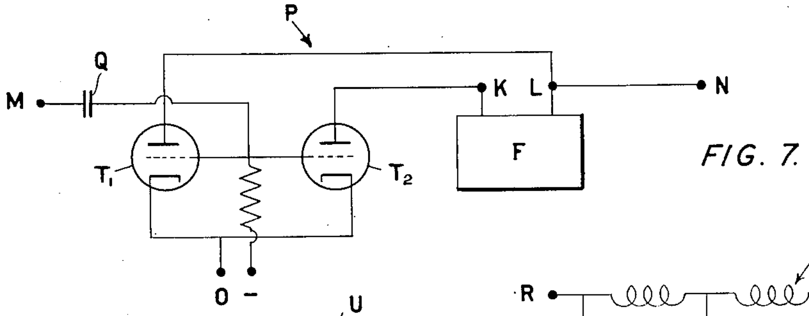
Figure 7 is a diagram showing an element of a binary counter.

It may be noted that in connection with Figures 2 and 3 above described and also in connection with Figures 4, 5 and 7, the grid and anode potentials are described and indicated with reference to the cathode at zero potential. Relative potentials, of course, alone are of significance.

In Figure 4 there is illustrated an inverter of a type I. This is illustrated as a triode having its grid connected to terminal D and through a resistor to the cathode. It will be evident that other multiple element tubes of various types may be equally well used. The output is taken off terminal E between the anode and its load resistor. This inverter of type I is used to transform negative pulses at D into positive pulses at E. In accomplishing this end, the inverter incidentally furnishes amplification which may or may not be necessary in the circuit.

Figure 5 illustrates a type of inverter I' which transforms positive pulses at terminal D' into negative pulses at terminal E'. Its nature is similar to that of the inverter of Figure 4 except that the grid connected to terminal D' is normally maintained at a negative cut-off potential.

Figure 6:
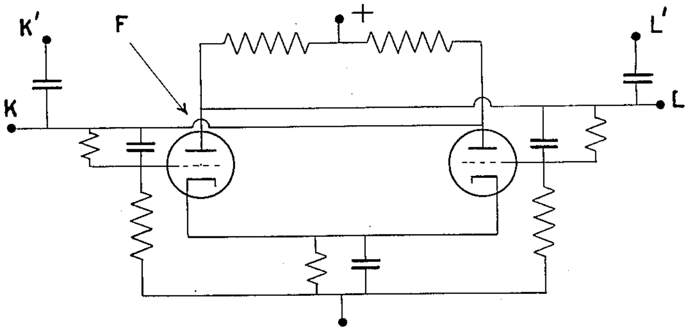
Figure 6 is a diagram illustrating a flip-flop of a type used in the system.

Figure 6 illustrates a flip-flop designated F. This comprises a pair of tubes which may be triodes or other multiple element tubes with their grids and anodes crisscross connected as illustrated with terminals K and L as input terminals and K' and L' as output terminals. The operation of this type of flip-flop is known in the art and need not be described in detail except to note that the application of a positive pulse to either of the inputs will transform the stable condition of the flip-flop so that it will act to maintain the positive condition of that input. If the circuit constants and potentials are properly chosen the flip-flop may also be transformed by the application of sufficient negative pulses to either of the inputs whereupon the input receiving the negative pulse will remain negative. As will be evident, the outputs K' and L' will have the respective polarities of the corresponding inputs K and L.

Figure 7 illustrates a binary counter which embodies as an element a flip-flop F. Triodes $T_1$ and $T_2$ have their grids connected to an input terminal M and also through a resistor to a source of negative cut-off potential. The respective anodes are connected to terminals K and L of the flip-flop F and terminal L is connected to the output terminal N. The binary counter element just described operates only on positive input pulses. When a positive input pulse is applied at M, that terminal K or L which was previously negative becomes positive, while the terminal which was previously positive becomes negative. Successive positive pulses at M accordingly produce successive positive and negative pulses at N. Negative pulses at M are without effect. Accordingly, if we consider only positive pulses, there will be a positive pulse emitted at N for every two positive pulses applied at M. The arrangement, accordingly, performs the function of dividing by two the number of positive pulses delivered to it. A series of such elements results in division by a power of two having an exponent equal to the number of such elements in series, the output N of one element being connected to the input M of the next. When such a series of counters is used, differentiating condensers such as Q are located between them.

Figure 8:
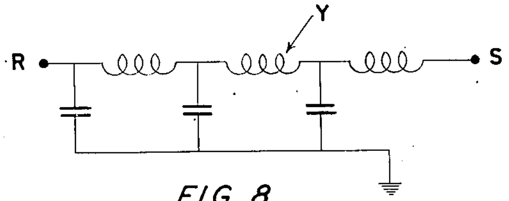
Figure 8 is a diagram illustrating a delay line element.

Figure 8 illustrates a delay line element Y which consists merely of a filter having inductance and capacity elements as indicated connected between its input terminal R and its output terminal S. Such an element will delay the transmission of a pulse between input and output for a time dependent upon the values of the circuit elements, which time may be determined in accordance with conventional filter calculations. A series of these delay elements will furnish a delay line from which taps may be taken to secure pulses at successive intervals of delay.

Figure 9:
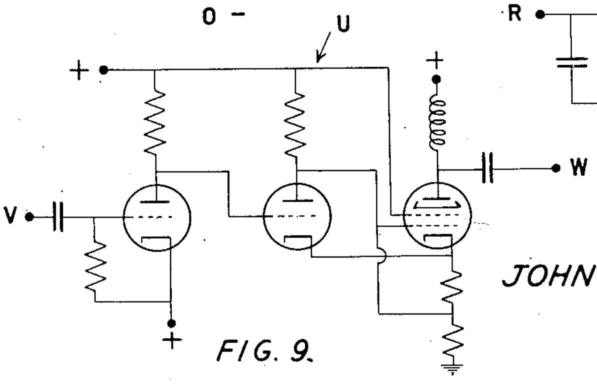
Figure 9 is a diagram illustrating a pulse former for translating broad pulses into narrow pulses.

Figure 9 illustrates a pulse former U which has the property of receiving broad pulses at its terminal V and emitting narrow pulses at its terminal W. The operation of this type of pulse former has already been described with reference to the elements 14 and 16 of Figure 1 and description thereof, accordingly, need not be here repeated.

Figure 10:
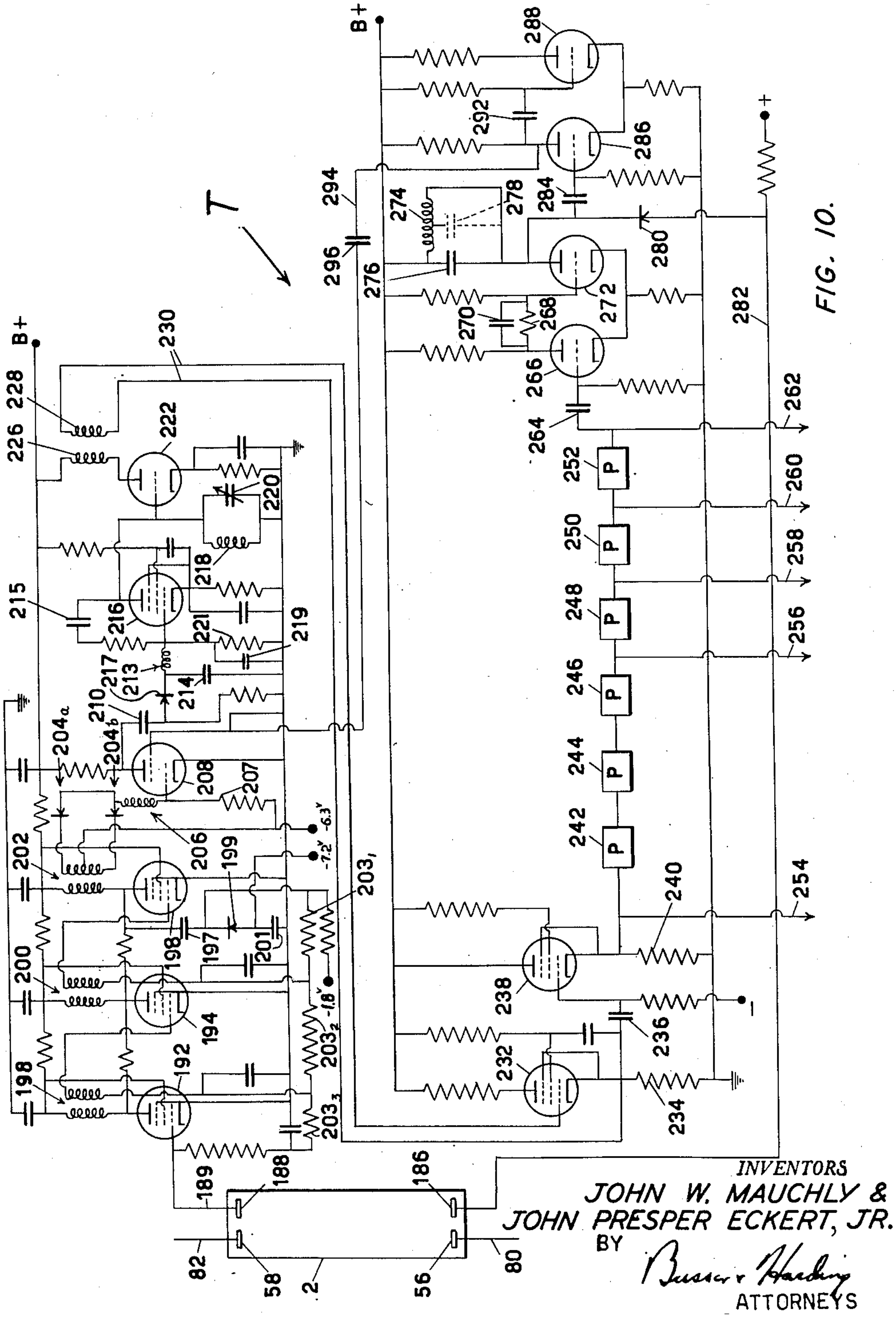
Figure 10 is a diagram illustrating a master oscillator and temperature correction system provided to maintain operation free of accumulated errors.

There will now be considered the master oscillator and temperature control system involved in Figure 10. The purpose of this system is to provide the pulses for operation of the complete system of Figure 11 with automatic control to avoid troubles due to temperature changes. Mercury tanks of the type heretofore described are such that the transmission times of pulses between the input and output are quite substantially affected by temperature to the end that, if a tank simultaneously contains a quite large number of digital pulse spaces, relatively small temperature changes may interfere with the emission of one pulse at the instant some other pulse spaced from the emitted pulse by a predetermined number is entering the tank. It may be here noted that the acoustic velocity in mercury decreases with rise of temperature. Insurance of proper operation results from the use of the system of Figure 10.

The tank 2 contains a second pair of crystals 186 and 188 similar to crystals 56 and 58 as heretofore indicated. As will be evident from the tank construction, the machining of the cylinder 20 to a uniform length throughout its circumference and the provision of parallel-face end plates 22 and 24 will insure identical spacing between the paired crystals 56 and 58 and 186 and 188.

The fact that the crystals 186 and 188 are in the same tank with the crystals 56 and 58 and provide transmission of pulses through the same body of mercury insures physical similarity with substantially identical temperature variations. However, if desired, two separate tanks may be provided, individual to the two sets of crystals, and so far as similar temperature variations are concerned these may be secured by having the tanks in close proximity to each other within, for example, a common insulated enclosure.

It may be here again remarked that the temperature is desirably maintained quite closely constant and for this purpose heat may be applied by current through the heating coil 78 under control of a thermostat responsive to tempertures within the enclosure. Such thermostatic control, however, forms no essential part of the present invention and need not be described in detail.

The output crystal 188 is connected to an amplifier comprising pentodes 192, 194 and 196, the coupling between successive pentodes being effected through transformers 198 and 200, while the output is taken from a transformer 202. The amplifier is of a broad band pass type capable of passing a wide band of frequencies disposed about the fundamental frequency of a signal which has as its frequency the natural vibration frequency of the output crystal 188. Impulses delivered at 186 cause, by shock excitation, a "ringing" of the crystal at its natural frequency. Accordingly, the output consists essentially of a carrier modulated by the input pulses at 186 and consisting, therefore, of the carrier and its side bands.

An automatic volume control of the delayed type is provided by feeding some of the output signal from the anode of the tube 198 through a condenser 197 and crystal rectifier 199 to a filter condenser 201 which is grounded. The junction between condenser 197 and rectifier 199 is connected to a negative low voltage source, while the junction between the rectifier 199 and condenser 201 is connected to a more negative low voltage source. A delayed automatic volume control action is applied from a series of resistors 203, $203_2$ and $203_3$ to the grids of the amplifier tubes, the junctions and left hand end of this group of resistors being connected to ground through condensers. Filter action and time lag are provided by this arrangement. the magnitude of the parameters of the resistance-capacity network being such that the action of this network is quite slow compared to a circulation period of the mercury tank. The purpose of the automatic volume control is to adjust the output of the amplifier to at least some standard value and to compensate for changes in amplification of the individual stages which may occur due to aging of the tubes. The delayed action insures maximum gain of the amplifier for any signals giving an output less than some predetermined magnitude.

The output from the amplifier is applied from the transformer 202 through a full wave rectifier, including crystals 204*a* and 204*b*, and inductance 206 to one grid of a gate tube 208 of the "normally off" G type, a negative bias being applied to this grid through resistor 207. A positive pulse having a rounded maximum is thus applied to the gate. The pulse applied to the other grid of gate tube 208 will be described in detail later. It will suffice at this point to point out that a peak voltmeter action results from the combination of this gate with a circuit consisting of a rectifier 217 and condenser 214 to which the output of the gate is fed through condenser 210. The condenser 214 and resistor 221 form an RC circuit having a large time constant. A reactance tube 216 and its conventional connections, including a phase-shifting condenser 219, are controlled by this peak voltmeter arrangement through a radio frequency choke 213 and in turn control the frequency of an oscillator comprising the triode 222 having a tuned grid circuit comprising the inductance 218 in parallel with the adjustable condenser 220 and also in parallel with the anode-cathode circuit of the reactance tube. Change of potential of the control grid of tube 216 changes the frequency of the oscillator in the usual fashion. The primary 226 of a transformer is in the anode circuit of tube 222 and has inductive coupling with inductance 228. The secondary 228 of this transformer feeds the oscillator output to a pulse former comprising the tubes 232 and 238. The grid of the second tube is coupled through the condenser 236 to the cathode of the first tube, associated with a resistor 234. The output is taken from the cathode resistor 240 of the second tube. The approximately sinusoidal output of the oscillator drives both tubes 232 and 238 into the saturation region during its positive swings while tube 238 is driven beyond cut-off during its negative swings so that the output consists of rectangular pulses which, with proper adjustment of the circuit elements, have a width substantially equal to half their period. These pulses are delivered through the output connection 254 and constitute the digit pulses of the system which are transmitted to the system of Figure 1 through its input connection 136.

The output pulses from the pulse former are then fed successively through the counter elements 242, 244, 246, 248, 250 and 252 of the type P previously described. Output connection 256 joined to the output of the binary counter element 246 delivers positive pulses at a frequency one eighth the frequency of those delivered at 254. Output connection 258 following the counter element 248 delivers pulses at a frequency one sixteenth the frequency of the pulses at 254. Output connection 260 following the counter element 250 delivers pulses at one thirty-second the frequency of the pulses at 254. Output connection 262 following counter element 252 delivers pulses at a frequency one sixty-fourth the frequeny of the pulses at 254. The pulses at each of these frequencies have widths approximately half their periods.

The output from the last counter element 252 is also fed through condenser 264 to an input pulse former comprising the triodes 266 and 272, the anode of the tube 266 being connected through the parallel arrangement of resistor 268 and condenser 270 to the grid of tube 272. The load on the anode of tube 272 consists of a delay line having a shorted end with a condenser 276 across its input. The delay line consists of an inductance 274 having lumped or distributed capacity to the return line connected to the anode of tube 272, this capacity being indicated at 278. The purpose of this arrangement is to cause reflection. The delay line may, for example, have a delay of 0.1 microsecond. A step potential applied across the condenser 276 will propagate a wave down the line which will be returned twice the delay time later in reverse phase. Thus as a result of a single step input there is generated a pulse having a width twice the delay time of this line. The output of the pulse former, taken through the crystal rectifier 280 as a positive pulse, is delivered through the line 282 to the crystal 186, connected, as indicated, through a resistor to a positive potential source so that the positive pulse referred to is delivered only when the input potential to the crystal rectifier rises above this source. As will be evident a pulse is applied at the crystal 186 once for every sixty-four pulses delivered at 254.

Connected to the anode of tube 272 through condenser 284 is a pulse widener comprising tubes 286 and 288 with the anode of the former connected to the grid of the latter through the condenser 292 giving the circuit the desired flip-flop characteristics. The output of the pulse widener is delivered as a positive pulse through the line 294 and blocking condenser 296 to the second controlling grid of the gate tube 208. The pulse thus provided begins at the instant of application of the driving pulse to the crystal 186 but extends for a substantial period thereafter, the period being of the order of at least half the magnitude of the period of duration of the rounded pulse applied to the other grid of the gate tube 208.

Figure 12:
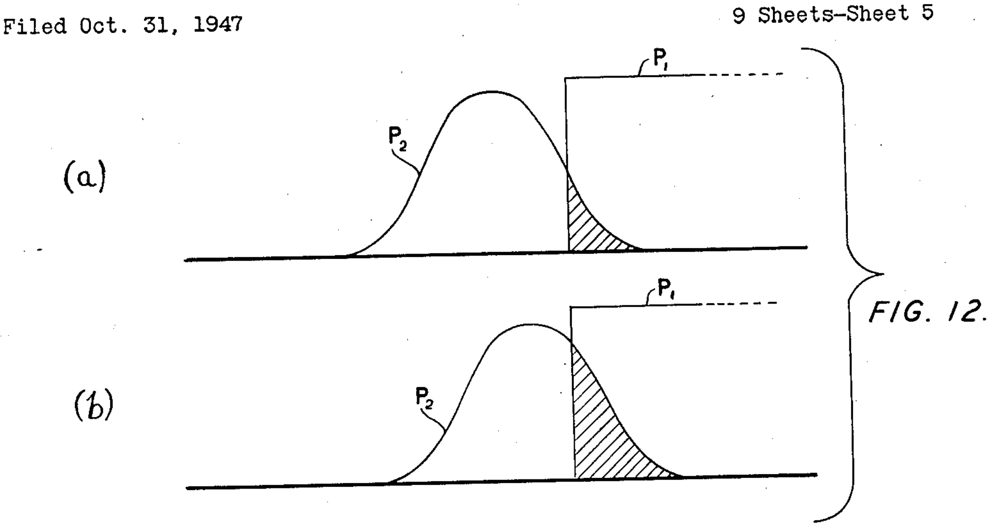
Figure 12 is a diagram illustrating the mode of control of the master oscillator involved in Figure 10.

Adjustments are so initially made that under desired conditions of operation the beginning of the wide pulse $P_1$ being admitted through line 294 to the gate tube 208 coincides with the portion of the rounded pulse $P_2$, applied to the gate tube 208 beyond its maximum amplitude, for example, as indicated at (a) in Figure 12, the pulse with which this last coincidence occurs being a pulse resulting from an input to the tank 2 at 186 occurring sixty-four digit pulses earlier. Under these conditions, the reactance tube grid has applied to it a peak potential resulting from the shaded portions of a series of pulses $P_2$ which will produce a frequency of the oscillator capable of maintaining the coincidence of the nature just described. Assume now that a temperature rise in the tank 184 produces a slower transmission velocity of pulses therethrough, as is the case, a rise of 1° C. decreasing the velocity by a factor of about $3.0\times10^{-4}$. The rounded pulse reaching the gate 208 will then be delayed with respect to the onset of the wide pulse from the line 294, as is indicated at (b) in Figure 12, with the result that the peak voltmeter arrangement will provide a more negative potential on the grid of the reactance tube. This change of potential will decrease the frequency of the oscillator (by increasing the inductive reactance of the tube) with the result that the point of coincidence of the pulses will shift toward the position of the point of coincidence on pulse $P_2$ illustrated at (a) to maintain approximately this predetermined coincidence condition of (a) in Figure 12. A temperature change in the reverse direction will produce a reverse operation. In any event, the control is such as to maintain substantially constant the phase of introduction of a pulse at 186 coincident with the emission of a pulse at 188 having its origin at 186 sixty-four digit pulses earlier. In other words, if any temperature change occurs, the oscillator frequency correspondingly changes so that the tank always contains sixty-four digit pulse spaces, sixty-four digit pulses occurring in the time of transit of a pulse from crystal 186 to crystal 188.

The fact that the two crystal systems, consisting of the pair 56 and 58 and of the pair 186 and 188, involve the same crystal spacing and the same temperature changes insures that if all the digit pulse spaces of the system comprising the crystals 56 and 58 were filled the first of a series of sixty-four pulses would be leaving that system at the crystal 58 when the first of another group of 64 pulses was entering at crystal 56. It is to be noted that even if a slight difference of transit time exists in the two crystal systems the recirculating pulses are timed up through the input at 136 in Figure 1.

Note may here be made of the fact that it is quite practical to use other pulse-timing devices for insuring proper distribution of pulses in a tank or other acoustic path or in equivalent devices. In the foregoing, the arrangement involved maintenance of the tank temperature substantially constant by thermostatic control, with control of the frequency of an oscillator to compensate for such tank temperature changes as might occur and for other changes, primarily arising from temperature, occurring elsewhere in the system and affecting the operation. However, an equivalent system would obviously involve taking advantage of the change of acoustic velocity in the tank with temperature: that is, an oscillator of substantially constant frequency may be used and coincidences of pulses of the type just described may be used to control the tank temperature to change the period of the recirculation cycle. This may be accomplished readily by causing the peak detector to control a tube in the plate circuit of which there is provided a heating coil surrounding the tank. The adjustment of the tank temperature thus effected will compensate for oscillator frequency drift and for such changes of the recirculation period as may be caused by other gradual changes in the complete circuit.

Before proceeding with a description of the complete system of Figure 11, a further preliminary matter may be discussed with reference to Figure 13. In this figure there are indicated at $256_a$, $258_a$, $260_a$ and $262_a$ the time relationship of pulses emitted at the terminals 256, 258, 260 and 262, respectively, of Figure 10. Designating the period of a pulse $256_a$ as a minor cycle and the period of a pulse $262_a$ as a major cycle, it will be evident that each major cycle comprises eight complete minor cycles as indicated by the Roman numerals I to VIII, respectively. The pattern illustrated in Figure 13 will obviously repeat itself for each major cycle. The eight respective minor cycles will be hereafter referred to as memory spaces having designations corresponding to the Roman numerals. In accordance with the assumptions consistently made heretofore, each memory space or minor cycle can evidently contain eight digit pulses.

The various memory spaces themselves are uniquely related to a particular pattern of pulses 258$_a$, 260$_a$ and 262$_a$. For example, memory space I corresponds to positive conditions of all three of these pulses. Memory space IV, on the other hand, corresponds to negative pulses of 258$_a$ and 260$_a$ and a positive pulse of 262$_a$, and so on. As will be hereafter pointed out, the memory spaces are determined by utilization of these individual and unique pulse patterns.

Heretofore there has been considered for consistency (and there will be hereafter considered for consistency) a system involving sixty-four pulses at 254 for each pulse at 262, and the corresponding eight memory spaces, eight digit pulses per space, etc. It will, however, be understood that these figures are chosen merely by way of example. Actually, by multiplication of the binary counters P in Figure 10, by the use of proper high frequencies and by proper lengths of tanks, the number of pulses simultaneously stored in a tank will be much greater than as indicated. The number of required repetitions of the various parts of the apparatus will, however, be evident and accordingly the description will proceed with the assumption of the smaller numbers of digit pulses and memory spaces as will make convenient a simple, but completely typical, description.

The particular significance of the memory spaces and the pulses therein is a matter of quite arbitrary selection as will be readily evident upon casual consideration. Within a memory space the particular sequence of pulses may be representative of numbers in the binary, decimal or any other system, or may define by code significance, letters, symbols, instructions or any other arbitrary information. Furthermore, the signifiance of the pulses in various memory spaces may differ. For simplicity of description it may be assumed that numbers in the binary system are represented by the pulse groups since equivalent to these numbers there may be any desired information in accordance with a particular chosen code. While the device as herein described is somewhat fundamental and relatively simple it will be appreciated that ordinarily it will consist merely of an element of some much more elaborate system such as that of a computer. It is in such connection that the pulse groups may represent not only numbers, letters and symbols but also instructions serving for the control of various other processes.

The reason for the provision of additional pairs of crystals in the tank 2 will now also be evident. While one pulse circulation system has been described it will be obvious that additional circulation systems may be associated with one or more additional pairs of crystals in the same tank with automatic temperature control by the single system of Figure 10. In fact, it will be evident that by utilizing a mercury tank of quite large cross-sectional area a very large number of crystal pairs may be simultaneously operated individually under a common temperature control.

Figure 11:
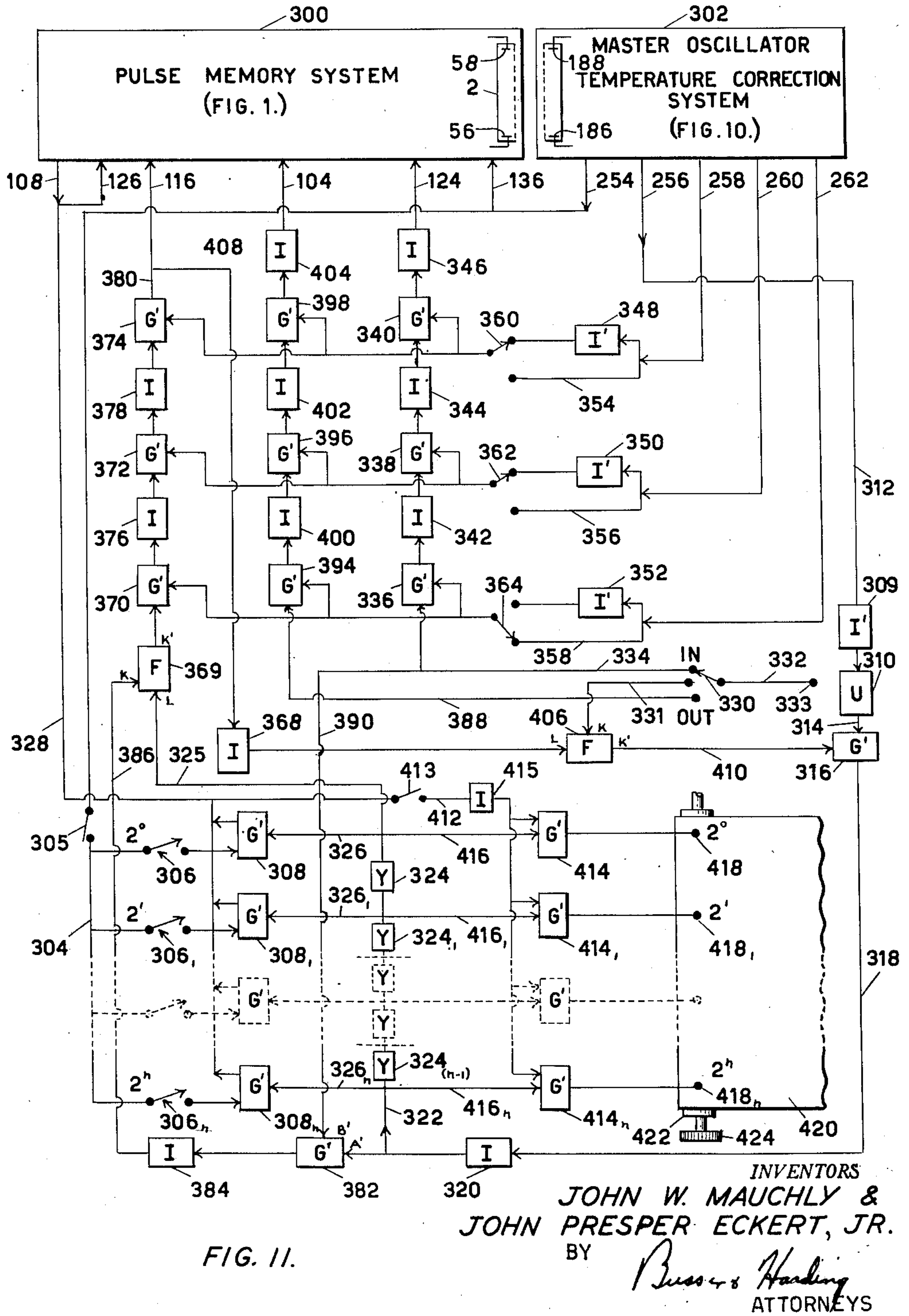
Figure 11 is a diagram illustrating a complete memory system with its controls for feeding in and feeding out information, and providing for erasure of information.

In Figure 11 there is disclosed an electrical system which is tied up with the pulse memory system of Figure 1 and the master oscillator and temperature correction system of Figure 10 which have been previously described, the objectives of the complete system of Figure 11 being to insert arbitrarily chosen code groups in desired locations in the pulse memory system, to clear predetermined code groups therefrom, and to provide for reading out of the memory system the contents of various memory spaces therein. As will be pointed out more fully hereafter, the system of Figure 11 is illustrated merely by way of example as involving certain manually operable switches and as involving a simple recording output device, although, in general, considerably more elaborate controls would replace the switches and output device.

The details of Figure 1 and Figure 10 are not repeated in Figure 11 but these groups of elements are indicated by the correspondingly marked boxes 300 and 302 which have external connections recognizable from Figure 1 and Figure 10 and indicated from left to right of Figure 11 as 108, 126, 116, 104, 124 and 136 of the pulse memory system and as 254, 256, 258, 260 and 262 of the master oscillator and temperature correction system.

In Figure 11 there are also illustrated, by lettered boxes, circuit elements of the types described above, these being gates, inverters, flip-flops, a pulse former and delay line elements. The operations of these individual elements will be clear from the above discussions. Where terminals are of significance, they are lettered to correspond to the disclosure of the element figures heretofore described.

A line 304, in which may be interposed a master switch 305, connects the digital pulse output connection 254 of the master oscillator system 302 with a group of switches 306, 306$_1$ . . . 306$_n$ which constitute digit switches of successive orders in the binary system. As will be evident hereafter, if a number to be entered in the form of a pulse or number group contains a unit in the order of $2^0$, the switch 306 is closed; if a digit is to be entered in the order $2^1$, the switch 306$_1$ is closed, and so on. The value of $n$ may be anything desired, but for consistent description let it be assumed that $n$ equals 7. There are then eight switches of the group 306. Individual connections from these switches 306 are made to gates of the type G′, 308, 308$_1$ . . . 308$_n$. It may be here noted that the dotted portions of Figure 11 represent $n$–2 repetitions of the various elements above these portions.

Minor cycle pulses emerging from the connection 256 are delivered through the line 312 and inverter 309 to pulse former 310. As was pointed out above, the minor cycle pulses are broad rectangular positive pulses having a duration approximately half the period of the minor cycle. These pulses provide in the output 314 of pulse former 310 narrow pulses having durations corresponding to those of the digit pulses emitted at connection 254. A gate 316 of the type G′ is arranged to pass these narrow pulses to a line 318 and thence through an inverter 320 of the type I to the input connection 322 of a delay line made up of delay elements of the Y type 324, 324$_1$ . . . 324$_{(n-1)}$. Between the various elements of the delay line and the gates of the group 308, there are input gate connections 326, 326$_1$ . . . 326$_n$.

A connection 332 joins a source 333 of direct positive potential with the multiple switch arm 330. This switch arm has three contact positions. A central position, in which the switch arm is normally held by a spring, connects it to a line 331 which runs to the terminal K of a flip-flop 406. The switch arm 330 may be manually moved to an "in" contact joined to a line 334. It may also be moved manually to an "out" contact connected to a line 388.

The line 334 is connected to a series arrangement of elements comprising in order gate 336, inverter 342, gate 338, inverter 344, gate 340 and inverter 346 and thence to the control connection 124 of the input gate 10 of the pulse memory system. The gates just described are of the type G′ and the inverters are of the type I. The arrangement is such that, if the gates are conditioned to pass pulses by having a positive potential applied through the line 334, they will provide positive pulses at connection 124, during predetermined minor cycles.

Connection 258 is connected to two contacts selectively engageable by a switch 360. The junction to the upper contact illustrated in Figure 11 is through an inverter 348 of the I′ type. The connections to the lower contact are directly through a line 354. Similarly, connection 260 is joined to upper and lower contacts of a switch 362 through inverter 250 and through connection 356. Connection 262 is similarly joined to the upper and lower contacts of a switch 364 through an inverter 352 and through connection 358. As will be evident from Figure 11, the switch arms 360, 362 and 364 are, respectively, connected to inputs of gates 340, 338 and 336.

Figure 13:
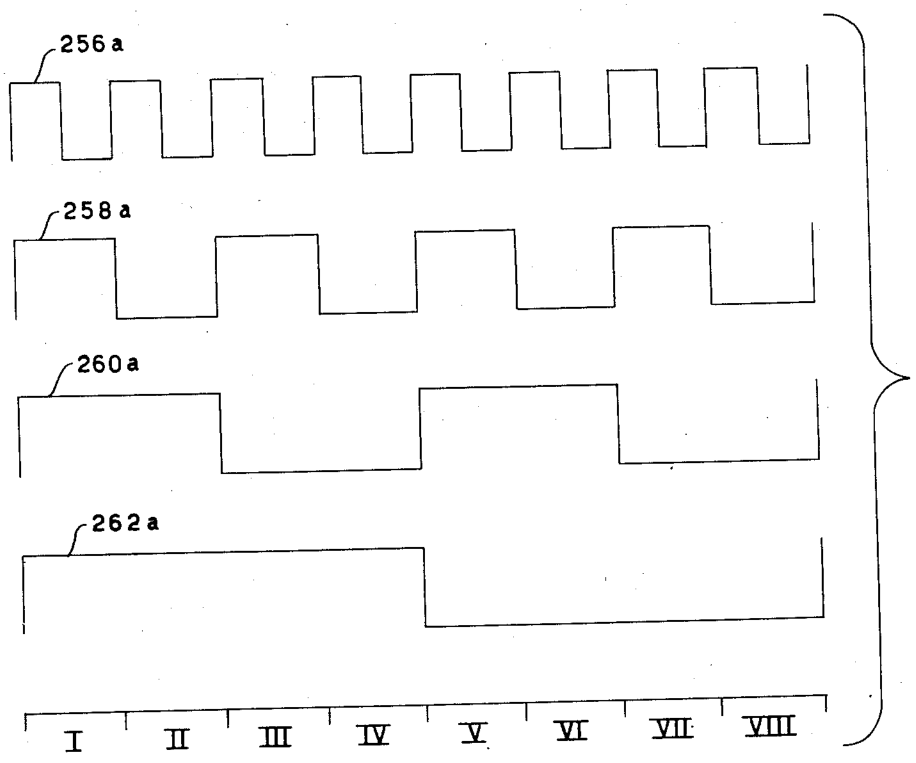
Figure 13 is a diagram illustrating the fashion in which memory spaces in the circulating system may be identified and individually subjected to control.

Referring to the pulse pattern of Figure 13, it will be evident that transmission of a positive potential from line 334 to connection 124 can be made, by manipulation of switches 360, 362 and 364, dependent upon existence of any one of the various pulse patterns corresponding to a particular memory space of the group I to VIII. Through a direct connection, such as 354, originally positive pulses emerging from 302 at 258 may be applied as positive gating pulses to the gate 340, while through the inverter 348 negative pulses at 258 may be transformed into positive gating pulses at 340. The same is true of the other two gates of this series. The particular switch arrangement illustrated in Figure 11 will be recognized, from reference to Figure 13, as corresponding to memory space IV. As will be made evident hereafter, the settings of these switches determine the memory spaces into which code groups are to be inserted or out of which existing code groups are to be read. The particular code group chosen is determined by such positions of the switches 360, 362 and 364 as will result in the application of positive pulses to all three gates of this group, and, as will be pointed out hereafter, of other similar groups.

Another series of gates and inverters including gate 370, inverter 376, gate 372, inverter 378 and gate 374 is connected through a line 380 to the connection 116 of the clear gate 8. As indicated in Figure 11, the gates of this group are also joined to the switches 360, 362 and 364 with the result that the series transmits pulses when the gates are simultaneously fed positive pulses through these switches.

To the output of the inverter 320 previously described, there is connected a gate 382 of the G′ type which in turn is connected through an inverter 384 of the I type to the terminal K of a flip-flop 369, the output K′ of which is connected to an input of gate 370. A connection 325 joins the output of the delay line element 324 with the terminal L of flip-flop 369. The terminal B′ of gate 382 is connected through line 390 to line 334 which is joined to the "in" contact of switch 330. Connection 116 is rendered negative by a positive condition of terminal K′ of flip-flop 369.

The line 388 connected to the "out" contact of switch 330 provides an input to a series of gates and inverters comprising gate 394, inverter 400, gate 396, inverter 402, gate 398 and inverter 404, the latter being connected to the control connection 104 of the output gate 6 of the pulse memory system. The gates of this group are connected as indicated to the switches 360, 362 and 364 so that here again coincidence of positive input pulses through these switches may result in transmission of a positive potential from line 388 to the connection 104 as a corresponding positive potential.

A connection 408 from the line 380 provides an input to an inverter 368, the output of which is connected to the terminal L of the flip-flop 406, the terminal K of which is connected through the line 331 to the middle contact of the switch 330, while the output K′ of which is connected through line 410 to control gate 316.

The line 328 connected with both external connections 108 and 126 of the pulse memory system joins them through a switch 413 to the line 412 connected through inverter 415 of type I to one input of each of a group of gates 414, $414_1$ . . . $414_n$ of the type G′. Connections 416, $416_1$ . . . $416_n$ connect the other input terminals of these gates with the respective connections between the delay line elements. The outputs of the gates of the group 414 are connected to styli 418, $418_1$ . . . $418_n$ which bear upon sensitized paper 420 which passes over a metallic feed roller 422, this roller being given a suitable potential to provide marking pulses through the paper when negative pulses are fed to the styli. A knob 424 may be provided to bring new portions of the paper under the stylus or, if a continuous type of recording is required, the roller 422 may be rotated through a motor driven gear train, continuously or intermittently, as desired.

It may be here noted that a common connection 328 is possible to both connections 108 and 126 of the pulse memory system since each of these is connected to a terminal of a corresponding gate while these gates are additionally controlled so as never to be simultaneously effective to pass pulses.

It will, of course, be understood that the connections between the various elements in Figure 11 do not imply that direct conductive connections are provided between the individual elements described above. Where required, blocking condensers may be used to provide for the application of various direct potentials while passing high frequency pulses, it being noted that even a major cycle recurs at quite high frequency. It will also be understood that wherever required amplifiers may be introduced in the various connections. Such details have been omitted for purposes of simplicity of disclosure but they will be readily apparent to those skilled in this art, being matters of design detail which in themselves form no part of the present invention.

The operation of the system so far described will now be explained, there being first considered the conditions which exist when no code group is being entered, cleared or read out, this being followed with descriptions of what is involved in entering a new code group and in reading out a code group.

The system may be assumed operating with various code groups in the memory spaces, it being considered that a blank space may be said to contain a code group representing (if numerical) zero. The switch 330 under these conditions will be in its mid-position connected to the positive supply terminal 333, so that the flip-flop 406 will be in a condition with its output terminal K′ positive. Switches 305 and 413 may be assumed closed for generality, though, as will be shortly evident, they are now without function. Digit pulses leaving the master oscillator system at 254 will be applied through the selectively closed switches 306 to the gates 308. Gate 316 will be conditioned to pass pulses from the pulse former 310 and line 314 through the inverter 320 which will provide positive pulses through the delay line consisting of the elements 324. Accordingly, digit pulses will be applied (sequentially as pointed out hereafter) through the line 328 to the input connection 126 of the pulse memory system. However, since both the lines 334 and 388 are disconnected from the line 332 by reason of the mid-position of the switch 330 no pulses will pass to the memory system through the connections 104 or 124 with the result that neither input nor output occurs. Furthermore, the fact that the switch 330 is not connected to the line 334 means that the gate 382 is closed so that pulses applied to this gate from the inverter 320 cannot pass to the flip-flop 369, the terminal K′ of which will be held negative, having been, as described hereafter, put in such condition by a positive pulse from the delay line through the input terminal L. The connection 116 is accordingly positive and the clear gate 8 will pass the pulses circulating in the memory system.

In brief, under the conditions just indicated, irrespective of the positions of the switches 360, 362 and 364 and of the switches of the digit group 306, there will be neither input nor output from the pulse memory system and the number groups therein will recirculate in the tank 2 without change but subject to control of the master oscillator in the fashion previously described.

Assume now that it is desired to make an entry of a code group in one of the memory spaces of the pulse memory system. In order to be specific let it be assumed that it is desired to enter in memory space IV the pulse or code group 00011011, assuming $n=7$. The group just indicated, if representative of a number in the binary system is equal to $2^4+2^3+2^1+2^0$, i. e., 27. This group, in accordance with what has been mentioned heretofore, may equally be in the nature merely of an arbitrary code representing certain information, instructions, or the like. To enter this group switches 306, $306_1$, $306_3$ and $306_4$ are closed while the other switches of this group are opened.

In order to choose memory space IV for insertion of the code group, switches 360 and 362 must be moved to their upper positions connected to the respective inverters 348 and 350, while the switch 364 is moved to its lower position connecting with the line 358. They then correspond to operation in accordance with the switching pattern (— — +) which, as indicated in Figure 13 corresponds to memory space IV.

As will be evident these preliminary settings of the switches 306 and 360, 362 and 364 will not effect results of consequence in the pulse memory system or in the way of recording, since effective functional pulses are blocked by the various gates and by the mid position of switch 330 as previously described. Switch 305 is now closed (if it has not been previously closed) and switch 413 may be opened if it is not desired to have a record made on the sheet 420 at the time of input. Switch 330 is then moved to its "in" position and the insertion of the code group takes place as follows:

Assume first that at the instant when switch 330 closes in its "in" position, that there is being delivered through the lines 258, 260 and 262 a pattern of pulses other than that corresponding to memory space IV. At this instant one or more of the gates 336, 338 and 340 and one or more of the gates 370, 372 and 374 are inhibited and consequently no pulses may enter the memory system at either 116 or 124, irrespective of what pulses may be fed to the terminals of these gates other than those controlled through the switches 360, 362 and 364. While flip-flop 369 is caused to shift polarity of its terminal K′ as later described, the first significant operation occurs at the beginning of that minor cycle (IV) which involves the chosen (— — +) pattern. It will be evident that in this minor cycle the gates 336, 338, 340, 370, 372 and 374 will be conditioned to pass signals to the connections 116 and 124. Accordingly, the following events occur.

Line 34 was rendered positive by movement of switch 330 to "in" position; accordingly at the beginning of minor cycle IV a positive potential is applied to connection 124 through the gates 336, 338 and 340, and their associated inverters 342, 344 and 346, this potential enduring throughout the complete minor cycle IV. The input gate 10 is thus conditioned for the entry of eight digit pulses during this minor cycle.

At the same time through the line 390 the positive potential at 333 conditions the gate 382 at its terminal B′ for passage of any pulses which may enter it at A′.

The wide half cycle positive pulse of minor cycle IV provides through inverter 309 and pulse former 310 a sharp positive pulse of short duration which is applied to the gate 316 through the line 314. This gate 316 is conditioned to pass this pulse since the terminal K′ of flip-flop 406 is positive resulting from the previous connection of the switch 330 to the line 331. A sharp negative pulse is accordingly emitted to the line 318 and is inverted into a sharp positive pulse in the inverter 320. This sharp positive pulse starts through the delay line at 322 and is also applied through the gate 382 and inverter 384 as a positive pulse to the terminal K of flip-flop 369. The output terminal K′ becomes positive and through the gates 370, 372 and 374 and the inverters 376 and 378 a negative potential is applied at the clearing gate 116. The conditioning of the flip-flop 369 results in the holding of the connection 116 negative through the minor cycle and accordingly the memory space IV is cleared by the blocking of its circulation through the memory system, so that any code group previously contained in this space is thus erased.

The negative potential provided at 380 from the flip-flop 369 is applied through the line 408 and inverter 368 as a positive potential at the terminal L of the flip-flop 406 so that the output terminal K′ of this flip-flop is rendered negative producing a blocking by the gate 316 of any further signals approaching this gate through the connection 314. The result is a single sharp pulse delivered through gate 316 at the beginning of minor cycle IV.

All of the foregoing events have occurred substantially instantaneously as compared with the width of even a digit pulse. The narrow pulse which entered the delay line at 322 now progresses through this line successively conditioning, through the connections 326, the various gates 308 in serial fashion so that, these gates being fed with the continuous series of digit pulses from the line 304, there will be serially emitted from these gates through the line 328 and connection 126 a group of pulses which in time relationship correspond in order and spacing to the closed switches of the group 306. In the present instance, for example, under the assumptions previously described there will be pulses introduced in the digit intervals 4, 5, 7 and 8. Since the input gate 10 is conditioned to receive these there is fed into the memory system in memory space IV the pulse group represented by 00011011.

As the pulse leaves the last delay element 324 it will, through line 325, act on the terminal L of the flip-flop 369 to render the terminal K' of this flip-flop negative. The result is to restore the terminal 116 of the clear gate 8 to positive condition so that erasing action ceases at the end of the minor cycle under consideration with the result that succeeding pulse groups in the memory system will recirculate without erasure. The positive pulse appearing at 380 and 116 will be blocked by the inverter 368 producing, if any pulse at terminal L of the flip-flop 406, only a pulse of insufficient amplitude to change the negative condition of its terminal K'. Accordingly, gate 316 remains inhibited and pulses from 256 in succeeding minor cycles will be blocked by this gate so long as switch 330 remains in "in" position. So long as the switch 330 is undisturbed no further introduction of the pulse group for which the apparatus is set up will occur, i. e., the introduction occurs only once irrespective of how long the "in" condition of switch 330 is maintained. Nor will any further erasure occur since no pulses are emitted from gate 382.

When the switch 330 is released to its mid position the flip-flop 406 is affected by the positive potential at 333 to condition gate 316 for passage of pulses. Simultaneously, however, the positive gating condition of terminal 124 of the input gate 10 is eliminated and the gate 382 is also restored to blocking condition. The result is operation as first above described in which, irrespective of various incidental pulses in the system, the memory system is unaffected and recirculation continues therein.

The assumption was above made that at the instant switch 330 was moved to "in" condition a pattern other than that corresponding to IV existed at the gates 336, 338 and 340. It is, of course, possible that the switch 330 could achieve its "in" position during the pattern corresponding to space IV. Assuming that this does occur it will be noted that the narrow pulse at the beginning of the minor cycle IV will have already reached gate 382 but will have been blocked by that gate because the gate is only conditioned to pass a pulse when the switch 330 is in "in" position. The result is that the flip-flop 369 will not be thrown in this cycle to condition through connection 116 the gate 8 for clearing action. The input gate connection 124, however, will be conditioned to receive pulses and the scanning by a pulse passing through the delay line elements 324 will occur so that new pulses will be introduced into memory space IV superimposed on the pulses already therein which have not been cleared. The resulting pulse group will, of course, be meaningless, but it will be cleared out and replaced by the desired pulse group in the next recurrence of the minor cycle. This results from the fact that the failure of appearance of a negative pulse at 116 is accompanied by the non-appearance of a positive pulse at the terminal L of the flip-flop 406 so that instead of its being thrown to block the gate 316, this gate 316 remains open to pass pulses and upon the next recurrence of the pattern for memory space IV a normal erasure of the code group in memory space IV occurs with substitution of the desider code group. It may be noted that the two conditions described are exclusive and even if closure of switch 330 to the "in" position occurs practically simultaneously with the onset of the minor cycle pulse one or the other of the described substitutions will occur, i. e., either proper entry of the code group will be effected in the first cycle or improper entry in that cycle will be followed by erasure and proper entry in the next subsequent major cycle.

To read out a code group it is only necessary to close switch 413 and then move the switch 330 to the "out" position from its mid position after setting the switches 360, 362 and 364 to the positions corresponding to the particular memory space from which read-out is to occur. The positions of the switch 305 and the switches of the group 306 are unimportant.

Since the switch 330 is at least transiently moved through its mid position, contact is made to condition the flip-flop 406, in turn conditioning the gate 316 for the passage of pulses. A narrow pulse similar to that previously described enters the delay line at 322 and proceeds to scan the gates of the group 414 which are fed with positive digit pulses from the pulse memory system through the line 328 and inverter 415 from the output connection 108, these pulses being given out by reason of the fact that through line 388 a positive potential is applied through the gates 394, 396 and 398 and their associated inverters to condition the connection 104 of the output gate 6 to cause it to emit the pulses from the desired memory space, the gates just mentioned being conditioned by the pulse pattern corresponding to this memory space. The coincidences of the pulses applied to the gates of the group 414 cause them to emit pulses which, through the styli 418, effect marking of the sheet 420 by those gates in which coincidences occur. It is to be noted that in this read-out operation gate 382 is blocked and consequently no clearing occurs nor is there any signal applied to the flip-flop 406 through its terminal L to block the gate 316. The result is that so long as switch 330 is held in its "out" position pulses will be delivered to the styli of the group 418 upon each recurrence of the minor cycle from which read-out is to occur. In the case of the other minor cycles no signals appear since the output is blocked by a negative condition of the connection 104 of the output gate. The result is, accordingly, the delivery of pulses at the various styli at a frequency corresponding to the major cycle frequency. The recorder may be of a type which will respond to a signal pulse or may alternatively be of a type which will respond only to the application through an extended time of a high frequency signal. In either case a record will be made of the contents of the selected memory space.

It will be evident that if during input to a memory space the switch 413 is closed then if the record sheet is of a type which will give a mark due to a single pulse it will record the introduced code group at the time of its introduction to give visible indication of entry.

It will, of course, be evident that clearing of any memory space, determined by the position of switches 360, 362 and 364, may be effected merely by opening the switch 305 and moving the switch 330 momentarily to "in" position.

The foregoing system for the introduction and read-out of pulse groups from the memory system represents, of course, a simple embodiment which, as ordinarily used in practice, would have substituted for its manual switches electronic switches under various controls and which would have substituted for its stylus marking output system considerably more complicated output devices. The switches 360, 362 and 364 would, of course, ordinarily be replaced by electronic gates subject to program controls. Likewise, switches of the group 306 would normally be replaced by electronic gates responsive to information taken from a magnetic tape, punched card or tape, or other record, or received from various units of calculating devices or other devices for carrying out logical procedures. The outputs from the group of gates 414 would normally be delivered to electronic control elements capable of making further use of the information or capable of recording it on magnetic tapes, punched cards or tapes, or other permanent memory devices or of delivering it to electrically operated typewriters or printers. What has been illustrated will be understood to be disclosed as a simple example showing how information may be fed into desired memory spaces of the system to which the present application relates, how such information may be erased and replaced by other information and how such information may be read out for use. It may, incidentally, be remarked that the outputs of the gates of the group 414 may be delivered to an oscilloscope with synchronized scanning at a major or minor cycle frequency so that the pulses in any particular memory space of the pulse memory system may be visually observed.

The foregoing complete system has been specifically described with reference to a mercury tank as the device through which orbital circulation of the pulses stored in the memory system takes place. It will be evident, however, that the electrical devices which have been described are equally applicable to the insertion into and extraction from any other delay device of pulses which are to be recirculated and/or controlled. For example, the mercury tank may be replaced by an electrical delay line or by various pulse carrying systems of the electrostatic, magnetic, phosphorescent, or other types referred to in the beginning of this specification. Furthermore, it may be noted that the orbital circulation may be relative in the sense that in various devices the pattern of pulses may be stationary and the input and output devices movable in the sense of relation to some fixed element; for example in a cathode ray type of device, the pattern may be fixed in the form of electrical charges located in lines on a fixed dielectric plate while scanning electron beams may be relatively movable across the lines of charges for imposing, erasing or reading out these charges, the beams and their associated elements thus constituting transducers equivalent, from the standpoint of this invention, to the input and output crystals of a mercury tank. Such devices will be hereafter described in greater detail but before proceeding with this description reference will be made to certain modified forms of mercury tanks which have special properties or involve novel types of construction.

Figures 16, 17:
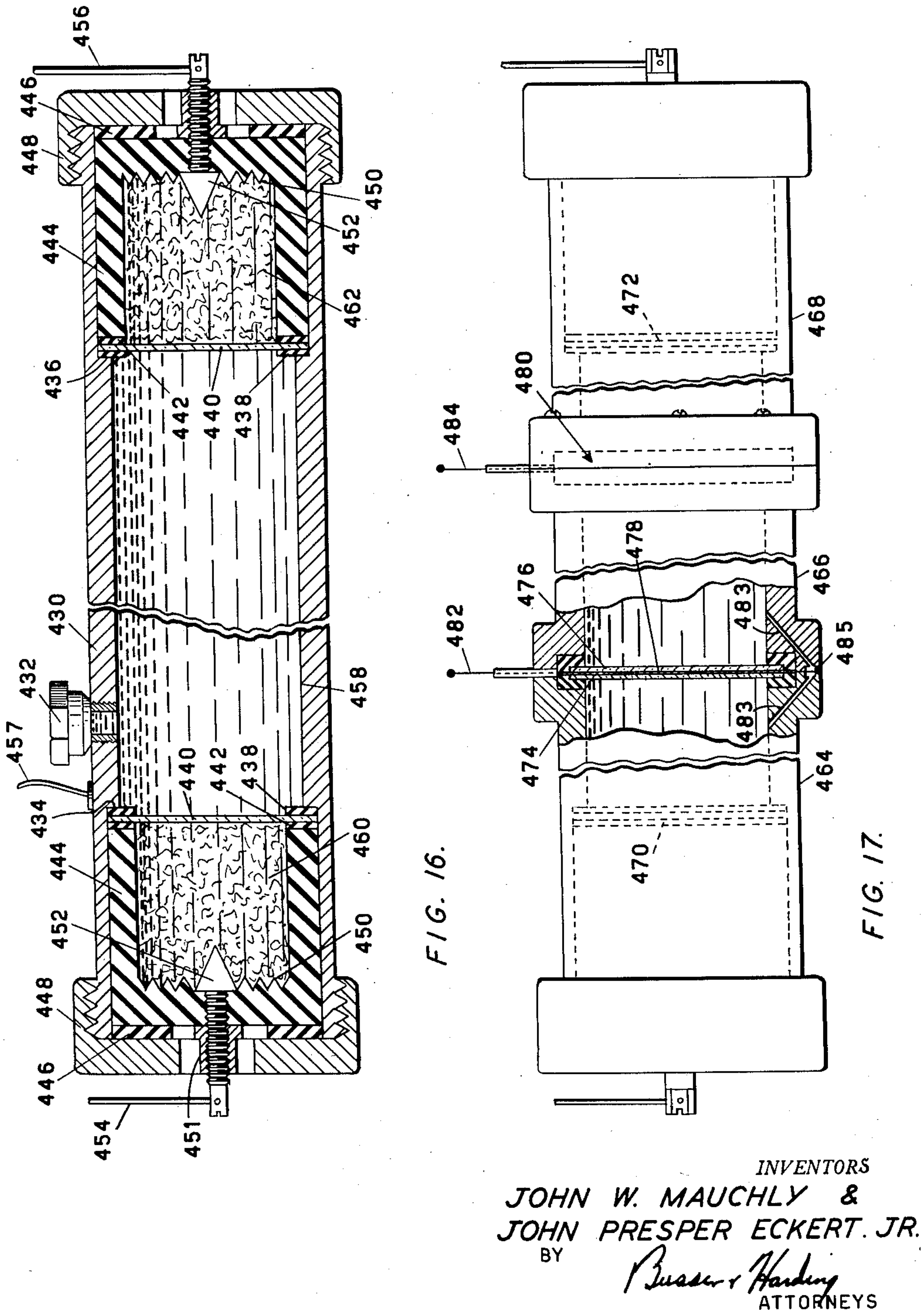
Figure 16 is an axial section taken through an alternative form of mercury tank.
Figure 17 is an axial section taken through still another form of mercury tank particularly provided for the reading out of information at positions other than its terminals.

Referring to Figure 16 there is illustrated therein a mercury tank having certain structural features which, as will be evident, may be incorporated in a multiple tank of the type previously detailed.

The tank comprises a metal tube 430 provided with a filling opening 432 and with internal shoulders 434 and 436. Washers 438 of insulating material engage the shoulders 434 and 436 and in flatwise engagement with them are quartz crystals 440 of the type previously described. Washers 442 are provided outside these crystals and are engaged by the ends of insulating cups 444 which are pressed inwardly by the action on resilient washers 446 of screw caps 448 threaded on the ends of the tube 430. The internal bottoms of the cups 444 facing the outer faces of the crystals 440 are provided with annular serrations 450 which provide, facing the crystals, angularly disposed walls which, as will be pointed out hereafter, tend to deflect disturbing reflections. Electrodes 452 having inwardly directed conical ends have threaded stems passing through the bottoms of the cups 444 and are secured thereto by nuts 451. Connections 454 and 456 are secured to these terminal electrodes. A connection 457 serves to provide electrical conduction to the tank 430 and the mercury between the crystals in the space 458.

The space 458 between the crystal faces is filled with mercury as are also the cavities 460 and 462 in the cups 444. However, these cavities also preferably contain acoustically absorbent material such as glass wool or the like for the purpose of damping acoustic waves propagated from the outer faces of the crystals.

As described previously in connection with the crystals their faces are desirably highly polished to secure good acoustic transmission between the crystals and the mercury.

In the construction just described the portion of the tube 430 between the shoulders 434 and 436 constitutes a hollow tube containing mercury continued by an end portion at each end of this tube carrying a piezo-electric crystal spaced by the washers 438 from the adjacent end of the tube. The cavities at 460 and 462 provided in each of these end portions open toward the central mercury tube and are closed by the faces of the crystals. The opposite wall of each cavity by reason of the serrations at 450 is angularly disposed with respect to the adjacent crystal face and contains mercury. The mercury in each of these cavities is insulated from the mercury between the crystals by the washers 438 and 442 pressed against the peripheries of the crystals. At each end of the line an electrical connection is made through the electrode 450 to the mercury in the cavity and the mercury in the hollow tube between the crystals is provided with an electrical contact at 457. As previously noted the mercury in the regions 458, 460 and 462 has an acoustic impedance substantially equal to the acoustic impedance of the piezo-electric crystals. The bodies of mercury furnish electrical contact with the crystal faces.

The fact that there is an impedance match between the crystals and the mercury insures a minimum of reflection of acoustic waves impinging on a crystal so that the receiving crystal, which may be either of those indicated, is substantially transparent to the acoustic waves which pass therethrough to be partially absorbed in the glass wool or other filler in the mercury in the end cavity while any residual waves reaching the ends of the cavity are reflected at such angles by the angularly disposed surfaces of the serrations 450 that they will be absorbed in the walls of the cavities without any substantial reflection back to the crystals. Accordingly, reflections are minimized. Furthermore, by reason of the impedance match between the crystals and the mercury the crystals will not continue to oscillate after the first impingement by a pulse, but rather any crystal oscillations will be quickly damped by reason of the free transmission of the energy to the mercury. The "Q" of the crystal is thus caused to be quite low.

While mercury is mentioned as the desired medium, it will be evident that liquids or substances other than mercury may be used which have similar acoustic impedances. In such cases, however, if the liquid is a non-conductor, electrical connections must be made to the crystal faces through thin metallic coatings thereon.

While quartz crystals are highly satisfactory, it will be evident that they may be replaced by other crystals such as those of Rochelle salt which may be carried by glass plates for the purpose of providing necessary mechanical strength. In such cases, of course, metallic coatings are provided for the purpose of securing electrical conductivity to the crystal faces.

If individual mercury or other tanks of the type just described or specifically illustrated are used, instead of providing a pair of acoustic delay lines in a single medium, the two tubes thus substituted for the single tank in Figures 1 and 11 should be closely contiguous to each other and within a common enclosure, preferably heat insulated, so that they partake of the same thermal variations. This will insure that they will not become so different in temperature as to disturb the proper uniform continuous operation of the system.

In certain instances it is desirable to transmit to external systems or devices pulses in transit in a delay line from one or more intermediate locations between its ends. Figure 17 illustrates a type of acoustic delay line in which this is possible. A tank is formed of a series of sections 464, 466 and 468 (there being more or less than the three illustrated), which sections are bolted together at their contiguous ends. Input and output crystals at 470 and 472 may be provided in any of the fashions previously indicated. In this instance, however, there are provided at the joints between the various tank sections transparent piezoelectric crystal arrangements which, while permitting free transmission of pulses from the input crystal to the output crystal, will serve to permit the taking off of electrical pulses during the passage of acoustic pulses. For this purpose, crystals 474 and 476 are cemented to opposite surfaces of metal foil indicated at 478 or are cemented to each other, adjacent faces of the crystals being coated with metal to provide conductivity. The outer faces of the crystals are, of course, in conductive contact with the bodies of mercury in the several chambers. External connections from the metallic electrode between the crystals are taken off as indicated at 482 and 484, the latter being from a crystal arrangement at 480 similar to that shown in section. For the purpose of preventing hydrostatic stresses the bodies of mercury in the various chambers are maintained in communication with each other through ducts 483 which communicate with chambers 485 formed in the flanges of the tank sections.

The crystals may be of quartz or of other material of piezo-electric character having acoustic impedances as nearly as possible equal to that of mercury. Glass plates may be used for the mounting of quartz or Rochelle salt crystals with suitable metallic coatings provided to form the electrodes for the crystals. When the acoustic impedance is matched the crystals with or without backing form a substantially integral part of the mercury body so that no material difference in transmission of acoustic pulses from the input to the output ends of the tank is perceptible as compared with a tank from which the intermediate take-off devices are absent. As the pulses pass the intermediate piezo crystal or crystals, however, electrical signals will be given off which may be used externally. The purpose of taking off signals intermediate the ends of the delay line is that there may be, in various instances, the desirability of securing a delay of take-off following the input to the line less than the transit time through the complete line. Sometimes it is desirable to take off simultaneously pulses in different memory spaces of the orbital circuit and this may be accomplished by the use of the tank just considered.

It may also be noted that, while pairs of crystals have been referred to at 474 and 476, one of them may be replaced by a support such as ceramic, glass or fused quartz which would be inactive from a piezoelectric standpoint. The support should, of course, be of a material forming a proper impedance match with the liquid used to prevent reflections which might become confused with the transmitted signals.

Figures 18, 19:
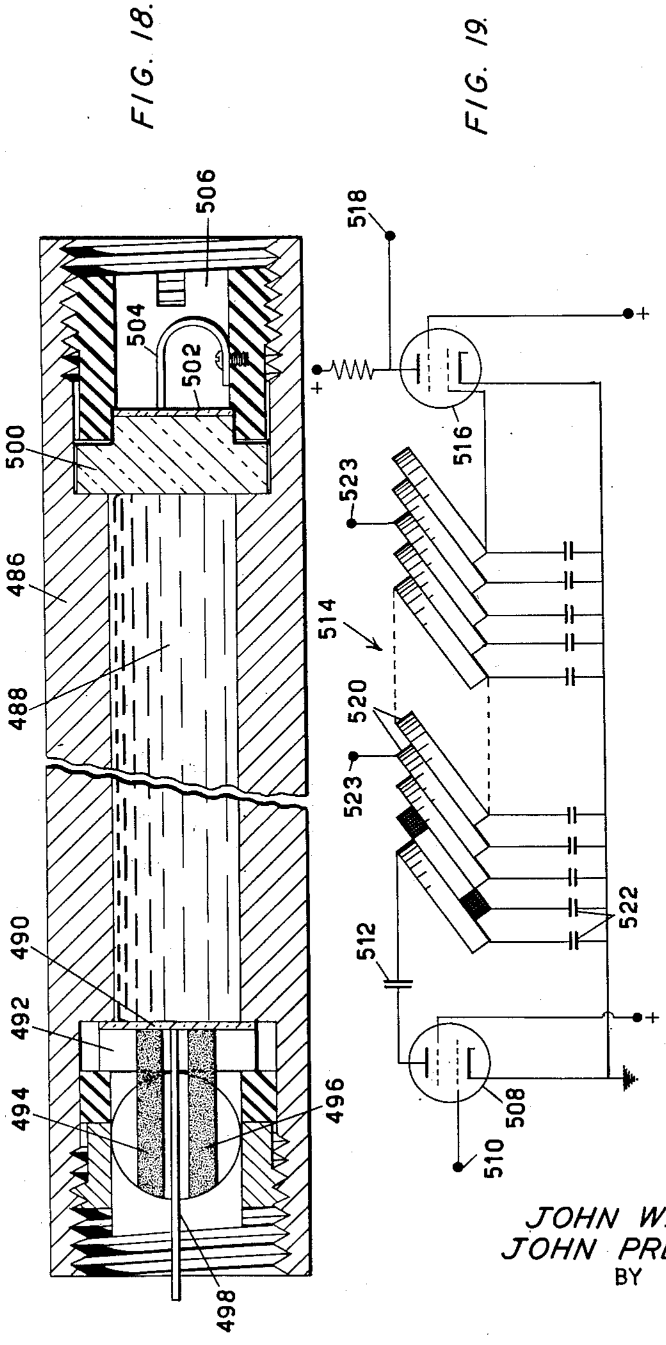
Figure 18 is an axial section of a further form of memory tank involving the reflection of pulses to secure an effective length of path equal to twice the length of a column of mercury.
Figure 19 is a diagram illustrating an electrical delay line which may be used for the orbital circulation of electrical pulses.

Figure 18 illustrates still another form of tank in which reflection of pulses is provided so that for a given physical tank length there may be secured a pulse path equal to twice this length. Furthermore, pulses may be taken off at the point of reflection. The tank in this case comprises a cylinder 486, the interior of which is filled with mercury or other liquid 488. A crystal 490 is cemented to a ceramic support 492 of the general type described in the first tank modification but in this instance the crystal essentially functions as two separate crystals by being provided on its outer cemented face with separate metallic coatings continued as indicated at 494 and 496 for the making of external connections. Between these connections there is desirably provided an electrostatic shield in the form of a metallic plate 498 which may be grounded and which is located between two separated portions of the support 492, these being cemented on opposite surfaces of the shield plate 498. At the opposite end of the tank a ceramic support 500 having the same acoustic impedance as mercury carries a crystal 502 coated on its surfaces with metal to provide electrical connections, the inner one of which may be grounded to the tank 486 while the outer one is connected through a wire 504 to a terminal mounted in the threaded clamping member 506. In the operation of this tank, assuming that the upper portion of the crystal 490 is used for transmission and the lower portion for reception, electrical signals are applied through the conductive coating 494 and give rise to acoustic pulses by reason of the piezoelectric effect of the crystal. These are transmitted through the mercury column and through the acoustically transparent support 500, being reflected by the outer surface of the crystal, which, in this case, is backed up by air having an acoustic impedance quite different from that of the crystal. The reflected pulses are retransmitted through the support 500 and the mercury column to the lower portion of the crystal 490 and, through the piezoelectric effect, give rise to electrical signals which may be taken off from the conductive coating 496. The transducers constituted by the upper and lower portions of the crystal 490 are essentially isolated from each other except for the reflection path just described. Direct waves from one portion to the other through the mercury are avoided due to the characteristic of a liquid as acoustic medium for suppressing transverse modes of acoustic waves. Selection of the proper crystal cut assures that the crystal will be sensitive only for waves received along paths orthogonal to its face plane.

Besides giving a halfway read-out point and cutting the length of the mercury column in half for a given delay path this tank has the advantage of keeping input and output leads to associated electronic equipment short, thus simplifying design.

As indicated above an electrical delay line may be used in place of an acoustic wave tank for providing an orbital path for the pulses. Such delay lines may take numerous forms and, as an example, there is illustrated in Figure 19 one such delay line which has been found quite satisfactory for this purpose. The input to this delay line is effected through the terminal 510 connected to the control grid of a tube 508. The delay line proper is connected to the anode of this tube through a blocking condenser 512 which isolates the high direct potential of the anode of tube 508 from the line and its connection to the grid of an output tube 516 from which the signals are delivered through the output terminal 518. The delay line indicated generally at 514 comprises a series of flat coils 520 which are arranged as illustrated at an acute angle to the axis of the assembly. The arrangement is such that, due to the overlapping of the coils, each of them has substantial mutual inductance with the immediately preceding and following coils but quite low mutual inductance with all of the other coils of the series. Extending between the junction of each pair of coils and the common ground line is a condenser 522. It will be understood that there will usually be used a large number of these coils to secure a long delay. Evaluation of the merit of a delay line consisting of repeated sections for the purposes here involved may well be made in terms of the ratio of the delay time D to the rise time R of an output pulse introduced into the line as a rectangular pulse, the time of rise being measured between the attainments of 5% and 95% of the full rise. This ratio D/R is equal to AnB in which $n$ is the number of sections and A and B are constants depending upon the physical structure of the line elements. In the type of line illustrated, A equals 1 and B equals 0.79 when the coefficient of coupling is 0.15. The same constants may be obtained with other physical arrangements of coils having mutual inductances. However, the other physical arrangements, in general, involve considerably larger physical space for the line including considerably larger coils. The line here indicated is both compact and has a high value for the figure of merit D/R. An electrical pulse entering such a line at one end is delivered at the opposite end after a time delay dependent upon the constants of the line. The appearance of the pulse at various junction points along the line is delayed proportionately to the distance to any such point, and, consequently, signals having less than the total delay may be taken off through intermediate terminals such as indicated at 523, the results attained being similar to those secured by an acoustic line of the type illustrated in Figure 17. It will be evident that, merely insuring proper impedance matches, the electrical delay line may be directly substituted for an acoustic delay line in a circuit such as that in Figure 1, a system of identical operating characteristics to that of Figure 1 being obtained by using two electrical delay lines to replace the mercury paths between the two pairs of crystals. As in the case of the mercury paths it is, of course, desirable that the two electrical delay lines should be maintained at the same temperature so that their electrical characteristics would remain substantially the same. Hence they should be in close promixity from a thermal standpoint, for example in the same thermally insulated housing. Other electrical delay lines of known types may be similarly used, including continuous electrical delay lines, such as a continuous long solenoid wound over a helical conducting strip on a cone to provide distributed capacitance, instead of delay lines having lumped parameters such as the one described.

Figure 20:
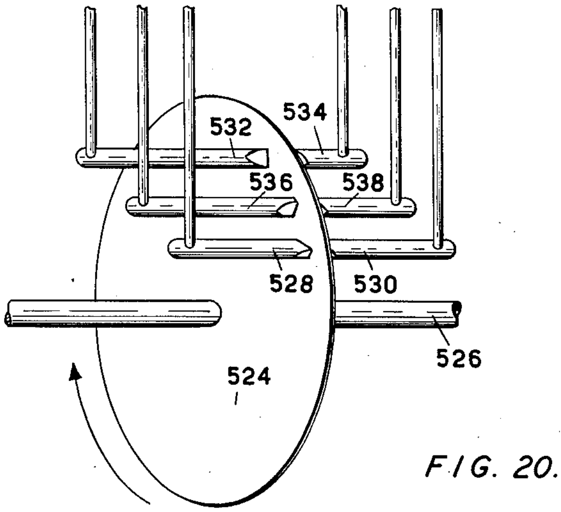
Figure 20 is a diagrammatic perspective view illustrating the fashion in which pulses may be impressed as electrostatic charges on a rotating disc.

Another type of delay element which may be used involves the provision of an endless movable carrier for pulses in the form of electrostatic charges. While this carrier may take various forms a convenient one is illustrated in Figure 20. Glass disc 524, driven through a shaft 526 from a constant speed driving motor, rotates between pairs of electrodes. Input is provided between the pair of sharp-edged electrodes 528 and 530. If high potential pulses, sufficiently high to cause corona, are fed to these electrodes, electrostatic charges are stored on the disc and are carried thereby to induce by electrostatic induction potentials between the sharp-edged output electrodes 532 and 534 which may deliver signals to an electrical system of the type illustrated in Figure 1. Between the output and input electrodes are erasing electrodes 536 and 538 which are charged to a high direct potential to erase the charges which pass the output electrodes. The pulses, of course, may be superimposed on direct charges continuously carried by the disc. The corona provides ionization to transfer electrons to the surface of the disc and may be more readily obtained if the apparatus is enclosed in a partially evacuated chamber or one in which there is contained a readily ionizable gas, such as neon or argon. Alternatively, the electrodes, instead of being spaced from the disc so as to require ionization for production of charges, may be in contact with the disc so that the charges may be directly conducted to or from the disc. It will be evident that delay is provided by such a device in the same effective fashion as in the case of the preceding modifications. The only variation required in Figure 1, if a pair of such electrostatic charge carriers is substituted for the pair of mercury paths, is the provision of sufficient amplification at the input to secure the high potentials necessary to imprint the electrostatic charges on the carrier. It will, of course, be evident that the system may be modified somewhat inasmuch as the charges may be carried by such a disc for more than one revolution without the need for regeneration through an external circuit, or regeneration may be provided on the disc itself through the well-known principles of the Wimshurst electrostatic machine. If two discs of the type just described are carried by the same shaft it will be evident that their operation, in substitution for the two acoustic paths of Figure 1, will be properly maintained quite independent of temperature changes since the delay time is accurately determined by the speed of disc rotation. Minor variations in this speed will, of course, be automatically compensated for by a system such as that of Figure 10, if desired.

It will be evident that the device of Figure 20 may also be embodied in a form in which minute magnetized areas are stored, in the form of small permanent magnets, on a disc or other endless member such as a magnetic tape by the substitution of electromagnet poles for the electrostatic electrodes. A disc carrying a coating of magnetic material or an endless tape may be used involving the adoption of the well-known principles for recording on magnetic wire or tape. Erasure may be effected in conventional fashion, for example, by the use of high frequency alternating magnetic fields or by the application of a direct magnetic field. In this magnetized type of element, the stored signals are permanent until erased so that external regeneration is unnecessary if the erasure is not continuous. Clearly, therefore, the circuit of Figure 1 may in this case be substantially simplified in a fashion which will be obvious to those skilled in the electronic arts, erasure being caused to occur only at desired parts of the signal pattern on the carrier.

Figure 21:
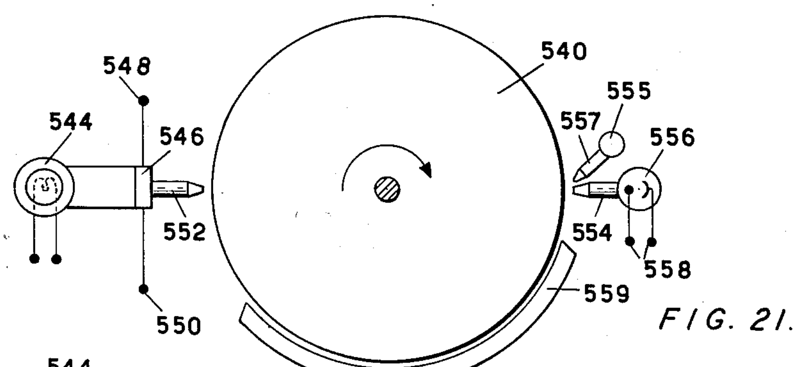
Figure 21 is a diagrammatic elevation and Figure 22 is a diagrammatic plan view of a modification in which pulses are imposed on a cyclically operating member carrying phosphorescent material.
Figures 22, 23:
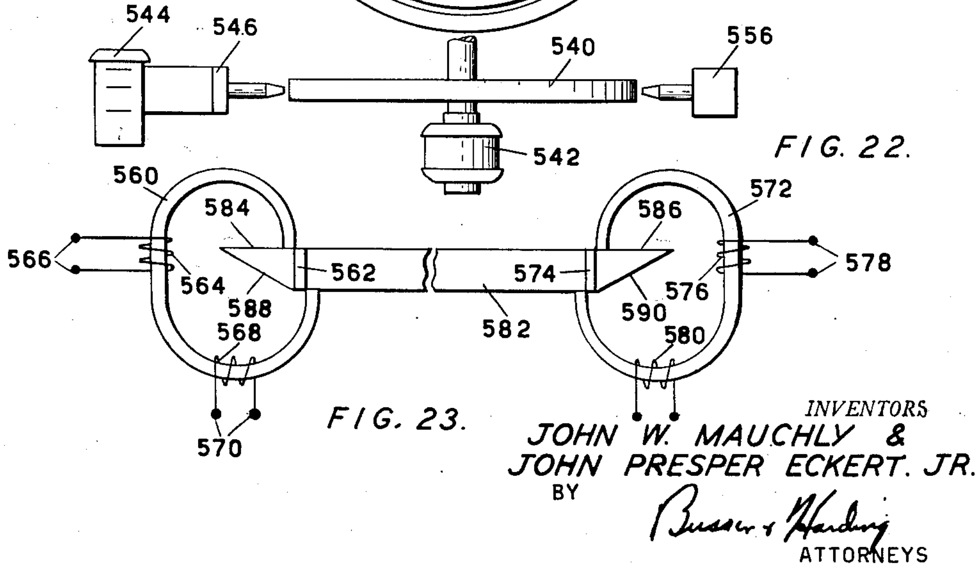
Figure 23 is a diagram illustrating the use of magneto-striction transducers for producing and receiving acoustic pulses.

Figures 21 and 22 illustrate still another form of delay device which may be substituted for the acoustic delay lines. In this case a rotating disc 540, driven by a constant speed motor 542, carries on its periphery a phosphorescent material which, by the impingement of light thereon, is caused to glow. A lamp 544 enclosed in a housing causes a beam of light to be projected on the phosphorescent periphery of the disc through a lens system located in a tube 552. Between the lamp and the lens system is located a light modulator 546 having signal input terminals 548 and 550. This light modulator may take numerous forms well known to the art and, as an example, may be of the type described in the patent to John Presper Eckert, Jr., 2,283,545, dated May 19, 1942. The illumination may thus be caused to provide on the phosphorescent edge of the disc either a variable density or a variable area track. The phosphorescent signals thus imprinted on the disc are carried to a pick-up unit comprising a lens system 554 and a photocell 556 having output terminals 558. Desirably, at the read-out point infra-red illumination is directed from a source 555 through a lens system 557 upon the periphery of the disc. As is known, various phosphors are triggered by the presence of infra-red radiation to cause a sudden release of energy providing a flaring up of the signals carried by the phosphor. Thus, even if the phosphorescence has substantially decayed by the time the location of the pick-up unit is reached, the presence of infra-red radiation will produce a brightening of the phosphorescent material at the points previously caused to glow at the input station. Use is also made of infra-red to produce rapid decay of the recorded signals following their passage beyond the output device and before they again reach the input device. For example, a curved source 559 of infra-red radiation may embrace this segment of the periphery of the disc so that the original signals are substantially completely erased in preparation for the recording of new signals. As will be evident, the system thus provided will function equivalently to the system of Figure 20 and to the acoustic delay line systems heretofore described. The modification of Figure 1 involved would be merely the substitution of two such delay elements for the two mercury delay lines with suitable input and output amplification to provide the necessary signal levels.

Figure 23 illustrates another acoustic system for providing a delay element in which acoustic waves are produced by magnetostriction and the acoustic path is through a solid acoustic conductor in the particular form illustrated though it will be evident that waves may be induced in a liquid such as mercury by magnetostriction in place of piezo-electric action.

A magnetic circuit is provided by an iron loop 560 having in a portion 562 thereof an element of a magnetostriction material formed, for example, of the well known iron and nickel alloys which exhibit magnetostriction effects. These effects are such that the application of a magnetic field produces a physical strain in the form of elongation, contraction or twist. In this case a small slab or plate of the magnetostriction material lies in a plane orthogonal to the direction of transmission of the acoustic wave and is caused to expand and contract by variations in the magnetic field therethrough, the arrangement being such that, at the location of the magnetostriction element the field has a substantial component in the direction of transmission of the waves. A coil 568 produces a magnetic bias in the magnetic circuit being provided with a direct current for the purpose of magnetically pre-stressing the element 562 to a suitable point on its B—H curve. Signals are superimposed on this biasing flux through the input coil 564 provided with input terminals 566.

A bar 582 serves as the transmission medium for the acoustic waves. This bar may be of ceramic material, glass or metal, desirably matched in acoustic impedance with the input transducer. The bar may, of course, be replaced by a column of mercury or other liquid. The reception of the acoustic waves is provided by a receiving transducer similar to the transmitting transducer and provided with a slab or plate of magnetostriction material 574 in a magnetic circuit illustrated at 572. Detection is provided by variable reluctance. In this case also a direct bias is provided by a coil 580 provided with a direct current. The electrical signals are taken off from the terminals 578 of the coil 576.

In order to prevent reflections there are continuations at 584 and 586 from the outer faces of the magnetostriction elements in the form of acoustic conductors which are provided with angularly disposed faces 588 and 590 which reflect the waves transmitted through the magnetostriction elements in a lateral direction to prevent their reflection back through the conductor 582. It will be evident that the delay element of Figure 23 is directly substitutable for mercury delay lines and a pair of these may be incorporated in the circuit of Figure 1 in place of the mercury lines with similar provisions for maintenance of the delay lines at substantially the same temperature.

Figure 24:
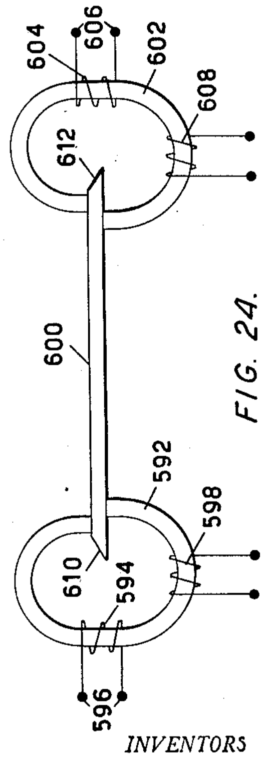
Figure 24 is a diagram illustrating the use of a bar of magnetostrictive material as a transmission medium for pulses.

In Figure 24 there is illustrated a second type of delay device involving magnetostrictive transducers. In this case, the input transducer is provided by a core 592, a signal coil 594 having input terminals 596 and a bias coil 598, the transducer thus being of the same type as illustrated in Figure 23. The output transducer is also similar comprising a core 602, an output coil 604 having output terminals 606 and a bias coil 608. The difference between this arrangement and that of Figure 23 is that there is provided a bar 600 of magnetostrictive material throughout its length, which bar functions not only to complete the magnetic circuits of the transducers but also to transmit the acoustic waves. The ends of the bar 610 and 612 are bevelled to prevent reflections as in the case of Figure 23.

Figure 25:
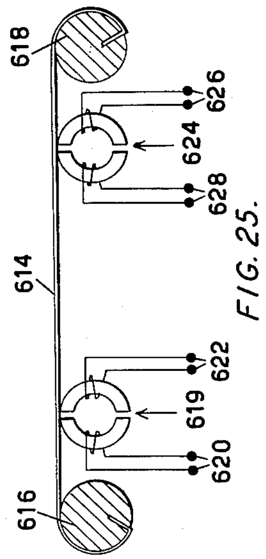
Figure 25 is a diagram illustrating the use of a tape or wire of magnetostrictive material as a transmission medium for pulses.

Figure 25 shows a magnetostrictive type of delay line which is even more desirable than those illustrated in Figures 23 and 24. In this modification, a tape or wire 614 of magnetostrictive material is clamped in and wound about supporting bars 616 and 618 with its ends being held under tension. A pair of magnetic recording heads 619 and 624, which may be identical with each other and are of the form commonly used for magnetic recording, provide the input and output transducers. Input terminals 620 provide for the supply of signals to the input coil of the head 619 while a bias coil thereof is provided with current through terminals 622. In the case of the output head 624, the signals are delivered through an output coil connected to the output terminals 626. Bias current is applied to a bias coil through the terminal 628. Even though a thin ribbon of magnetostrictive tape is used, acoustic waves will be very effectively transmitted to give rise after suitable delay time to output signals through the output transducer. The winding of the ends of the magnetostrictive tape about the supports prevents reflections from occurring at either end of the line.

The various modifications of delay lines which have been illustrated are merely illustrative of many equivalent possibilities which may be used in accordance with the invention, and, in particular, in conjunction with the electrical circuits which have been heretofore described. Acoustic waves, for example, may be transmitted through a gas by a separated loud speaker and a microphone. Such an arrangement may be particularly desirable where it is desired to use low frequency pulse rates, for example, less than 200,000 cycles per second since the speed of propagation of acoustic waves within a gas is low as compared with solid or liquid media.

The use of solid media for transmitting acoustic waves has been illustrated and it will be obvious that piezo electric crystal transducers may be used in conjunction with a solid line such as one formed of a glass which provides an excellent acoustic impedance match with the quartz crystals. Furthermore, glasses may be secured which have a very low temperature coefficient of velocity of acoustic waves. Alternatively, several glass rods may be connected in series having different temperature coefficients of velocity to provide a net substantially zero coefficient. Thus, difficulties with temperature variations may be minimized.

The detection of acoustic waves in glass may be accomplished by taking advantage of the rotation of a polarized beam of light through the glass which will exhibit the changes due to the strains set up by the waves.

If very long delays are desired, they may be obtained by producing surface waves on a liquid such as mercury. Such a wave can be imposed at an input station by electrostatic attraction at one end of a tank causing the liquid to be lifted vertically toward an electrode. The surface wave can be electrostatically detected by a similar electrode at the other end of the tank. A coil spring of soft material can also be used to transmit low velocity acoustic waves if the spring is stretched between two electromechanical transducers.

Through the use of extremely high frequencies, the delays in transmission of radio waves and of light may also be used. Small diameter coaxial lines coiled on a support may carry radio waves between input and output transducers, and, in this fashion, a very long line may be located in a reasonably small physical space. In devices of this sort, it may be noted that wave amplifiers, such as the well known travelling wave tube amplifiers, may be introduced having broad band transmission characteristics so as to transmit pulses without too much distortion of their wave shapes which might not be correctable. In optical delay devices, light may be modulated using, for example, a Kerr cell employing Polaroid and a suitable lens system or a light modulator of the type referred to in the Eckert patent mentioned above. A modulated light beam may thus be transmitted through a straight or multiply reflected light path, or along light guides such as can be made of Lucite, to a photoelectric cell for detection.

Reference has already been made to the use of cathode-ray type tubes in which charges may be impressed upon a dielectric surface by intensity modulation of an electron beam. Such charges may be retained on the surface by electron bombardment but they can also be regenerated on the surface by reimpressing the signals at regular intervals before the charge has leaked away. By a duplication of the pattern on the dielectric surface of a single cathode ray tube or by a pair of cathode ray tubes of this type, information may be transferred between them through the use of electron beams, the motions of which provide the relative motion analogous to that secured in the various arrangements heretofore described, i. e., the electron beams constitute parts of input and output transducers which have relative movements with respect to a pattern of signals which, in this case, is fixed.

Numerous other equivalents of the systems described will be evident to those skilled in the art and it will, therefore, be understood that to the extent it relates to regeneration of signals, reading-in of signals, reading-out of signals and erasure of signals, the invention is not to be construed as limited necessarily to the preferred mercury delay devices specifically described.

What we claim and desire to protect by Letters Patent is:

1. In combination, a delay device having an input and an output and arranged to deliver through the output, after a predetermined delay interval, signals entering the input, and electrical devices joining the output and the input to reintroduce through the input signals emitted from the output to provide recirculation of a predetermined pattern of signals through the delay device, said delay device comprising a cyclically moving carrier on which said signals are sequentially impressed.

2. In combination, a delay device having an input and an output and arranged to deliver through the output, after a predetermined delay interval, signals entering the input, and electrical devices joining the output and the input to reintroduce through the input signals emitted from the output to provide recirculation of a predetermined pattern of signals through the delay device, said delay device comprising a cyclically moving carrier on which said signals are sequentially impressed as electrostatic charges.

3. In combination, a delay device having an input and an output and arranged to deliver through the output, after a predetermined delay interval, signals entering the input, and electrical devices joining the output and the input to reintroduce through the input signals emitted from the output to provide recirculation of a predetermined pattern of signals through the delay device, said delay device comprising a cyclically moving carrier on which said signals are sequentially impressed as magnetic patterns.

4. In combination, a delay device having an input and an output and arranged to deliver through the output, after a predetermined delay interval, signals entering the input, and electrical devices joining the output and the input to reintroduce through the input signals emitted from the output to provide recirculation of a predetermined pattern of signals through the delay device, said delay device comprising a cyclically moving carrier on which said signals are sequentially impressed as phosphorescent patterns.

5. In combination, a source of substantially uniformly spaced pulses, frequency dividing means for emitting a plurality of series of pulses having submultiple frequencies related to the frequency of the first mentioned pulses in accordance with predetermined powers of 2, cooperatively related control devices controlled by said pulses of submultiple frequencies to establish a group of intervals uniquely differentiated from each other by predetermined coincidences of said pulses of submultiple frequencies, a delay line receiving pulses at a frequency corresponding to that of succession of said intervals, connections from said delay line for the emission of pulses originating from the last mentioned pulses at intervals approximately corresponding to those of pulses from said source, means selectively controlling the transmission of pulses from said connections, means controlled both by the last mentioned selectively controlled pulses and by said control devices for emitting pulses in a predetermined pattern only in a predetermined one of said group of intervals, a delay device having an input and an output and arranged to deliver through the output, after a predetermined delay interval, pulses entering the input, connections joining the output and the input to reintroduce through the input pulses emitted from the output to provide recirculation of a predetermined pattern of pulses through the delay device, and means for introducing into said connections the pulses emitted by said means subject to dual control.

6. In combination, a source of substantially uniformly spaced pulses, frequency dividing means for emitting a plurality of series of pulses having submultiple frequencies related to the frequency of the first mentioned pulses in accordance with predetermined powers of 2, cooperatively related control devices controlled by said pulses of submultiple frequencies to establish a group of intervals uniquely differentiated from each other by predetermined coincidences of said pulses of submultiple frequencies, a delay line receiving pulses at a frequency corresponding to that of succession of said intervals, connections from said delay line for the emission of pulses originating from the last mentioned pulses at intervals approximately corresponding to those of pulses from said source, means selectively controlling the transmission of pulses from said connections, and means controlled both by the last mentioned selectively controlled pulses and by said control devices for emitting pulses in a predetermined pattern only in a predetermined one of said group of intervals.

7. In combination, a source of substantially uniformly spaced pulses, frequency dividing means for emitting a plurality of series of pulses having submultiple frequencies related to the frequency of the first mentioned pulses in accordance with predetermined powers of 2, cooperatively related control devices controlled by said pulses of submultiple frequencies to establish a group of intervals uniquely differentiated from each other by predetermined coincidences of said pulses of submultiple frequencies, a delay line receiving pulses at a frequency corresponding to that of succession of said intervals, connections from said delay line for the emission of pulses originating from the last mentioned pulses at intervals approximately corresponding to those of pulses from said source, a delay device having an input and an output and arranged to deliver through the output, after a predetermined delay interval, pulses entering the input, connections joining the output and the input to reintroduce through the input pulses emitted through the output to provide recirculation of a predetermined pattern of pulses through the delay device, means controlled by said control devices for emitting recirculating pulses only during a predetermined interval, and a plurality of output devices, each receiving all of the recirculating pulses emitted during said predetermined interval and each connected to only one of the connections from said delay line, each output device being arranged to deliver a pulse only upon coincidence of pulses received by it from its delay line connection and from the group received by it in said predetermined interval.

8. In combination, a delay device having an input and an output and arranged to deliver through the output, after a predetermined delay interval, signals entering the input, and electrical devices joining the output and the input to reintroduce through the input pulses emitted from the output to provide recirculation of a predetermined pattern of pulses through the delay device, said electrical devices including means for erasing pulses from predetermined positions in said recirculation cycle and means for inserting pulses in such predetermined positions in said recirculation cycle.

9. In combnation, a delay device having an input and an output and arranged to deliver through the output, after a predetermined delay interval, signals entering the input, and electrical devices joining the output and the input to reintroduce through the input pulses emitted from the output to provide recirculation of a predetermined pattern of pulses through the delay device, said electrical devices including circuit means for delivering to a load circuit pulses selected from predetermined positions in said recirculation cycle.

10. In combination, a delay device having an input and an output and arranged to deliver through the output, after an approximately constant delay interval, signals entering the input, electrical devices joining the output and the input to reintroduce through the input signals emitted from the output to provide recirculation of a predetermined pattern of signals through the delay device, a second delay device, an oscillator providing pulses to said second delay device, means responsive to output pulses from said second delay device and to pulses provided by said oscillator to vary the frequency of said oscillator to maintain the frequency of the oscillator substantially fixed in relation to the transit time of pulses through the second delay device, and means controlled by pulses from the oscillator to control the time of entry into the first delay device of recirculating pulses therein.

11. In combination, a delay device having an input and an output and arranged to deliver through the output, after an approximately constant delay interval, signals entering the input, electrical devices joining the output and the input to reintroduce through the input signals emitted from the output to provide recirculation of a predetermined pattern of signals through the delay device, a second delay device, an oscillator providing pulses to said second delay device, means responsive to output pulses from said second delay device and to pulses provided by said oscillator to vary the frequency of said oscillator to maintain the frequency of the oscillator substantially fixed in relation to the transit time of pulses through the second delay device, and means controlled by pulses from the oscillator to control the time of entry into the first delay device of recirculating pulses therein, said delay devices being constructed and arranged to have substantially identical variations of said delay interval.

12. In combination, a delay device having an input and an output and arranged to deliver through the output, after an approximately constant delay interval, signals entering the input, electrical devices joining the output and the input to reintroduce through the input signals emitted from the output to provide recirculation of a predetermined pattern of signals through the delay device, a second delay device, an oscillator providing pulses to said second delay device, means responsive to output pulses from said second delay device and to pulses provided by said oscillator to vary the frequency of said oscillator to maintain the frequency of the oscillator substantially fixed in relation to the transit time of pulses through the second delay device, and means controlled by pulses from the oscillator to control the time of entry into the first delay device of recirculating pulses therein, said delay devices having a common medium for transmitting their signals as acoustic disturbances so that they have substantially identical variations of their delay intervals.

13. In combination, a storage device adapted to receive and deliver information, a first information transfer link receiving information from said storage device and returning the information thereto, a signal line, a second information transfer link receiving information from said signal line and delivering said information to said storage device, and means disabling said first information transfer link during the operation of said second information transfer link.

14. In combination, a storage device adapted to receive and deliver information, a first information transfer link receiving information from said storage device and returning the information thereto, a signal line, a second information transfer link connected between the information receiving portion of said first information transfer link and said signal line, and a third information transfer link connected between the information returning portion of said first information transfer link and said signal line.

15. In combination, a storage device adapted to receive and deliver information, a first information transfer link receiving information from said storage device and returning the information thereto, a signal line, a second information transfer link connected between the information receiving portion of said first information transfer link and said signal line, an intermittently operable third information transfer link connected between the information returning portion of said first information transfer link and said signal line, and means disabling said first information transfer link during the operation of said third information transfer link.

16. In combination, a storage device adapted to receive and deliver information, a signal line, a signal transfer link connecting said signal line and the information receiving portion of said storage device adapted to impress new information thereon, and means clearing the portions of said storage device receiving new information prior to the impression of said new information thereon.

17. In a system for the distribution of impulses, a signal line, a control line, a plurality of normally inoperative signal transfer links associated with corresponding receiving devices, said signal transfer links having the property of operating only in the presence of both a control and signal stimulus, and means connecting said signal transfer links with said signal line and said control line progressively delaying the application of stimuli from one of said lines to said signal transfer links.

18. In a system for the distribution of electrical impulses, a signal line carrying an impulse group having $n$ impulse time spaces, a control line carrying an impulse originating substantially simultaneously with the beginning of said group and having a duration substantially corresponding to said impulse time space, a plurality of normally inoperative signal transfer links associated with corresponding receiving devices, said signal transfer links having the property of operating only in the presence of both a control and signal stimulus, a delay line connected with a plurality of leads and providing a signal at a successive lead delayed over that on the preceding lead by a time substantially corresponding to said impulse time space, said leads being connected individually with corresponding signal transfer links, means connecting one of said first lines with said delay line, and means connecting the other said lines with said signal transfer links.

19. In combination, an electric device characterized by a plurality of stable equilibrium conditions separated by a zone of instability, means including a first source of impulses adapted to establish a first of said stable equilibria, means including a second source of impulses normally leading said first impulses adapted to establish a second of said stable equilibria, and means adapted to connect said electric device with a work circuit.

20. In combination, an electric device characterized by a plurality of stable equilibrium states separated by a zone of instability, means including a first source of impulses adapted to establish a first of said stable states, means including a second source of impulses normally leading said first impulses adapted to establish a second of said states, and means adapted to link said electric device with a work circuit effective to energize said work circuit only during the transition from a predetermined one of states to a predetermined other of said states.

21. In an impulse generating circuit, a first electric discharge device having a cathode, a control electrode and an anode, a resistor connected between said anode and a positve terminal of a source of electric energy, a second electric discharge device having a cathode, a control electrode and an anode, a resistor connected between said second anode and a positive terminal of a source of electric energy, means galvanically connecting said first anode and said second control electrode, a third electric discharge device having a cathode, a control electrode and an anode, a work impedance connecting said third anode with a positve terminal of a source of electric energy, a common resistor connecting said second and third cathodes with an electric source terminal negative with respect to said second and third positive terminals, a capacitor coupling said second anode and said third control electrode, direct current conducting means connecting said third control electrode with a point on said common cathode resistor, and means adapted to impress impulses on said first control electrode.

22. In signal delay apparatus, a first delay path characterized by a first transit time variable with changes in an ambient condition, a second delay path intimately associated with said first delay path in respect of said condition, having a second transit time variable with changes in said condition, means for generating periodic impulses having a period less than half said first transit time and impressing said impulses on said first delay path, means for generating impulses having a period less than half said second transit time spaced in time an amount substantially equal to said second transit time, and means jointly responsive to the output of said second generating means and the output from said second delay path for controlling the periodicity of the impulses delivered by said first generating means.

23. In combination, a generator of periodic impulses, having a predetermined period, means for providing impulses having substantially said period spaced by a plurality of said periods, a delay path characterized by a transit time approximating said plurality of periods adapted to receive impulses from said impulse providing means, and means jointly responsive to impulses delivered from said delay path and said impulse providing means for controlling the periodicity of impulses produced by said generator.

24. In combination, a generator of periodic impulses having a predetermined period, means for providing impulses with a duration less than said predtermined period at a rate which is an integral submultiple of the frequency of said generator, a delay path characterized by a transit time substantially equal to the submultiple period adapted to receive impulses from said impulse providing means, and means jointly responsive to impulses delivered from said delay path and said impulse providing means for controlling the periodicity of impulses produced by said generator.

25. In data translating apparatus, a signal line, a plurality of circuit controllers adapted to be set up in accordance with input data, means for scanning said circuit controllers and delivering an impulse sequence controlled thereby to said signal line, and means for determining said scanning operation subsequent to the delivery of a completed impulse sequence to said signal line.

26. In data translating apparatus, a signal line, a plurality of circuit controllers, a source of electric impulses having a predetermined duration period spaced by a selected period, a delay line provided with a plurality of leads adapted to delay impulses appearing on adjacent leads by a time substantially equal to an integral fraction of said selected period, a signal transfer link connecting said source with one end of said delay line, means responsive to said impulses on said delay line leads for delivering to said signal line an impulse sequence determined by said circuit controllers, and means for disabling said signal transfer link upon the completion of said impulse sequence.

27. In data translating apparatus, a signal line, a plurality of circuit controllers adapted to be set up in accordance with the data to be translated, a source of relatively short electric impulses spaced by a selected relatively long period, a delay line provided with a plurality of leads adapted to delay impulses appearing on adjacent leads by a time substantially equal to an integral fraction of said selected period, a signal transfer link connecting said source with one end of said delay line, means responsive to said impulses on said delay line leads for delivering to said signal line an impulse sequence determined by said circuit controllers, and means responsive to the arrival of an impulse at the end of said delay line for disabling said signal transfer link.

28. In combination, a storage device adapted to receive and deliver information in impulse form, a normally inoperative generator of impulses of standard form connected with an input to said storage device, and means for actuating said generator in response to information impulses appearing at an output of said storage device.

29. In combination, a storage device adapted to receive and deliver information in impulse form characterized by a difference in the form of input and output impulses, a normally inoperative generator of impulses of standard form connected with an input to said storage device, a signal line, and means for alternatively actuating said generator in response to impulses appearing at an output of said storage device and in response to information on said signal line.

30. In an information storage system, a source delivering impulses in a group characterized by a group period embracing more than one impulse period, a storage device provided with input and output connections and having the property of delivering at the output connection after a time interval greater than one impulse period impulses corresponding to impulses impressed on said input connection, an electric network impressing on said input connection impulses corresponding to impulses appearing at said output connection, and a connection between said source and the loop comprising said storage device and said electric network.

31. In an information storage system, a source delivering impulses in a group characterized by a group period embracing more than one impulse period, a storage device provided with input and output connections and having the property of delivering at the output connection after a time interval greater than one impulse period impulses corresponding to impulses impressed on said input connection, an electric network operable and inoperable in response to control stimuli impressing on said input connection impulses corresponding to impulses appearing at said output connection, a connection between said source and the loop comprising said storage device and said electric network, and control apparatus governing said electric network.

32. In an information storage system, a source delivering impulses in a group characterized by a group period embracing more than one impulse period, a storage device provided with input and output connections and having the property of delivering at the output connection after a time interval greater than one impulse period impulses corresponding to impulses impressed on said input connection, an electric network operable and inoperable in response to control stimuli impressing on said input connection impulses corresponding to impulses appearing at said output connection, a connection between said source and the loop comprising said storage device and said electric network, control apparatus governing said electric network, an output signal line, and a connection between said loop and said output signal line.

33. In an information storage system, a source delivering impulses in groups characterized by a group period embracing more than one impulse period, a storage device provided with input and output connections and having the property of delivering at the output connection after a time interval substantially equal to a plurality of group periods impulses corresponding to impulses impressed on said input connection, an electric network impressing on said input connection impulses corresponding to impulses appearing at said output connection, a connection operable and inoperable in response to control stimuli linking said source and the loop comprising said storage device and said electric network, a control stimulus source delivering stimuli having a duration substantially corresponding to one of said group periods, and a connection applying said control stimuli to said operable and inoperable connection.

34. In an information storage system, a source delivering impulses in groups characterized by a group period embracing more than one impulse period, a storage device provided with input and output connections and having the property of delivering at the output connection after a time interval substantially equal to a plurality of group periods impulses corresponding to impulses impressed on said input connection, an electric network impressing on said input connection impulses corresponding to impulses appearing at said output connection, a connection linking said source and the loop comprising said storage device and said electric network, a control stimulus source delivering stimuli having a duration substantially corresponding to one of said group periods, an output signal line, a connection operable and inoperable in response to control stimuli linking said output signal line with the loop comprising said storage device and said electric network, and a connection applying said control stimuli to said operable and inoperable connection.

35. In an impulse circulating network, a signal propagating element characterized by a predetermined transit time provided with input and output connections, a source developing impulses spaced in time by a period less than said predetermined transit time, an impulse retiming device excited from said source delivering an output signal at a standard time with respect to said source in response to input signals, a connection between the output of said signal propagating element and the input to said retiming device, and a connection delivering output signals from said retiming device to the input of said propagating element.

36. A delay device having a predetermined delay interval, an oscillator providing pulses to said delay device characterized by a pulse period less than the delay interval of said delay device, and means responsive to output pulses from said delay device and to pulses provided by said oscillator to vary the frequency of said oscillator to maintain a substantially constant relationship between the oscillator frequency and the transit time of pulses through the delay device.

JOHN PRESPER ECKERT, Jr.
JOHN W. MAUCHLY.

REFERENCES CITED

The following references are of record in the file of this patent:

UNITED STATES PATENTS

| Number | Name | Date |
|---|---|---|
| 2,169,304 | Tournier | Aug. 15, 1939 |
| 2,212,173 | Wheeler | Aug. 20, 1940 |
| 2,263,902 | Percival | Nov. 25, 1941 |
| 2,272,754 | Stratton | Feb. 10, 1942 |
| 2,401,094 | Nicholson | May 28, 1946 |
| 2,407,505 | Michael | Sept. 10, 1946 |
| 2,423,306 | Forbes | July 1, 1947 |
| 2,429,227 | Herbst | Oct. 21, 1947 |
| 2,434,259 | Burton | Jan. 13, 1948 |
| 2,436,808 | Jacobsen | Mar. 2, 1948 |
| 2,471,408 | Busignies | May 31, 1949 |
| 2,482,973 | Gordon | Sept. 27, 1949 |
| 2,532,546 | Forbes | Dec. 5, 1950 |